US008034255B2

(12) United States Patent
Goldfinger

(10) Patent No.: US 8,034,255 B2
(45) Date of Patent: *Oct. 11, 2011

(54) LIQUID CRYSTAL COMPOSITIONS

(75) Inventor: Marc B. Goldfinger, West Chester, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/480,003

(22) Filed: Jun. 8, 2009

(65) Prior Publication Data

US 2010/0308270 A1 Dec. 9, 2010

(51) Int. Cl.
*C09K 19/20* (2006.01)
*C09K 19/30* (2006.01)
*C09K 19/58* (2006.01)
*C09K 19/12* (2006.01)

(52) U.S. Cl. ............... 252/299.67; 428/1.1; 252/299.62; 252/299.63; 252/299.65; 252/299.66; 252/299.5

(58) Field of Classification Search .................... 428/1.1; 252/299.01, 299.5, 299.62, 299.63, 299.65, 252/299.66, 299.67

See application file for complete search history.

(56) References Cited

U.S. PATENT DOCUMENTS

| | | | |
|---|---|---|---|
| 4,099,856 | A | 7/1978 | Weissflog et al. |
| 4,637,896 | A | 1/1987 | Shannon |
| 5,506,704 | A | 4/1996 | Broer et al. |
| 5,560,864 | A | 10/1996 | Goulding |
| 5,780,629 | A | 7/1998 | Etzbach et al. |
| 5,793,456 | A | 8/1998 | Broer et al. |
| 5,833,880 | A | 11/1998 | Siemensmeyer et al. |
| 5,885,242 | A | 3/1999 | Arick et al. |
| 5,942,030 | A | 8/1999 | Schuhmacher et al. |
| 6,010,643 | A | 1/2000 | Coates et al. |
| 6,090,308 | A | 7/2000 | Coates et al. |
| 6,120,859 | A | 9/2000 | Buchecker et al. |
| 6,136,225 | A | 10/2000 | Meyer et al. |
| 6,217,792 | B1 | 4/2001 | Parri et al. |
| 6,410,130 | B1 | 6/2002 | Schuhmacher et al. |
| 6,475,574 | B1 | 11/2002 | Coates et al. |
| 6,607,677 | B1 | 8/2003 | Buchecker et al. |
| 6,723,395 | B2 | 4/2004 | May et al. |
| 6,887,455 | B2 | 5/2005 | Carpenter et al. |
| 7,622,192 | B2 | 11/2009 | Hayes |
| 2007/0116945 | A1 | 5/2007 | Goldfinger |
| 2007/0152188 | A1 | 7/2007 | Silverman |
| 2007/0154718 | A1 | 7/2007 | Silverman |
| 2007/0228326 | A1* | 10/2007 | Goldfinger et al. ...... 252/299.01 |
| 2007/0267599 | A1 | 11/2007 | Goldfinger et al. |
| 2009/0161061 | A1 | 6/2009 | Qi |
| 2010/0079721 | A1 | 4/2010 | Qi |
| 2010/0308268 | A1 | 12/2010 | Goldfinger |
| 2010/0308269 | A1 | 12/2010 | Goldfinger |

FOREIGN PATENT DOCUMENTS

| | | |
|---|---|---|
| WO | 2009023759 A2 | 2/2009 |
| WO | 2009023762 A1 | 2/2009 |

OTHER PUBLICATIONS

CAPLUS 1951: 24179.*
Aelony, "Direct esterification of phenols with higher fatty acids", Journal of the American Oil Chemists' Society (1955), 32, 170-2.*
Baessler et al., Helical Twisting Power of Steroidal Solutes in Cholesteric Mesophases, The Journal of Chemical Physics, vol. 52, No. 2 (1970), pp. 631-637.
Palffy-Muhoray, P., The Diverse World of Liquid Crystals, Physics Today, vol. 60, No. 9 (2007), pp. 54-60.
Degennis et al., The Physicsl of Liquid Crystals, Oxford University Press, Oxford, GB (1995) [Book, not Included].
Broer et al., In-situ photopolymerization of oriented liquid-crystalline acrylates, 3a), Makromol. Chem. vol. 190 (1989), pp. 225-2268.
Demhlow, Trialkoxycyclopropenylium Ions, Agnew Chem. Int'l Edition, vol. 13, No. 3., (1974) p. 209.
Broer, et al., Photo-Induced Diffusion in Polymerizing Chiral-Nematic Media**, Adv. Mater, vol. 11, No. 7 (1999), p. 573.
Pretsch et al., Spectral Data for Structure Determination of Organic Compounds, Springer-Verlag, Berlin Heidelberg, 2nd Ed., (1989)—Book, Not Included.
Sakagami et al., New Series of Liquid Crystalline Polyacrylates with Wide Mesomorphic Temperature Range, Chemistry Letters (1990) pp. 413-414.

* cited by examiner

*Primary Examiner* — Shean C Wu

(57) ABSTRACT

This invention relates to a liquid crystal composition and articles comprising the composition. The composition comprises at least one compound of each of the Formulas (I), (II) and (III),

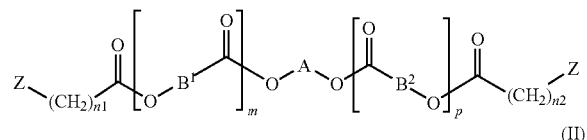

(I)

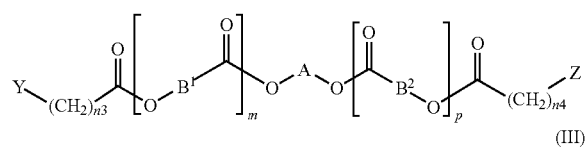

(II)

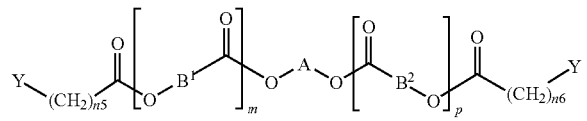

(III)

as defined herein. A process for making the composition is also provided.

42 Claims, No Drawings

LIQUID CRYSTAL COMPOSITIONS

TECHNICAL FIELD

This invention relates to liquid crystal compositions that contain mixtures of functionalized and non-functionalized compounds, to processes for preparing the liquid crystal compositions, and to articles fabricated from the compositions.

BACKGROUND

Thermotropic liquid crystals are generally crystalline compounds with significant anisotropy in shape. That is, at the molecular level, they are characterized by a rod-like or disc like structure. When heated they typically melt in a stepwise manner, exhibiting one or more thermal transitions from a crystal to a final isotropic phase. The intermediate phases, known as mesophases, can include several types of smectic phases wherein the molecules are generally confined to layers; and a nematic phase wherein the molecules are aligned parallel to one another with no long range positional order. The liquid crystal phase can be achieved in a heating cycle, or can be arrived at in cooling from an isotropic phase. The structure of liquid crystals in general, and twisted nematic liquid crystals in particular, is further discussed in "The Physics of Liquid Crystals", de Gennes and Prost, Oxford University Press, 1995.

An important variant of the nematic phase is one wherein a chiral moiety is present, referred to as a twisted nematic or cholesteric phase. In this case, the molecules are parallel to each other as in the nematic phase, but the director of molecules (the average direction of the rodlike molecules) changes direction through the thickness of a layer to provide a helical packing of the nematic molecules. The pitch of the helix is perpendicular to the long axes of the molecules. This helical packing of anisotropic molecules leads to important and characteristic optical properties of twisted nematic phases including circular dichroism, a high degree of rotary power; and the selective reflection of light, including ultra-violet, visible, and near-IR light. Reflection in the visible region leads to brilliantly colored layers. The sense of the helix can either be right-handed or left-handed, and the rotational sense is an important characteristic of the material. The chiral moiety either may be present in the liquid crystalline molecule itself, for instance, as in a cholesteryl ester, or can be added to the nematic phase as a dopant, with induction of the cholesteric phase. This phenomenon is further discussed in sources such as Bassler and Labes, *J. Chem. Phys.*, 52, 631 (1970).

There has been interest in preparing stable polymer layers exhibiting nematic and/or cholesteric optical properties. One approach has been to synthesize monofunctional and/or polyfunctional reactive monomers that exhibit a nematic or cholesteric phase upon melting, formulate a low melting liquid crystal composition, and polymerize the liquid crystal composition in its nematic or cholesteric phase to provide a polymer network exhibiting stable optical properties of the nematic or cholesteric phase. Use of cholesteric monomers alone, as disclosed in U.S. Pat. No. 4,637,896 for example, provides cholesteric layers with the desired optical properties, but the polymer layers possess relatively weak mechanical properties.

A need thus remains for liquid crystal compositions that have broad thermal windows, low melting points and good phase stability against crystallization, and that are easy to prepare and can be tuned to give desired properties.

SUMMARY

One embodiment of the inventions hereof provides a composition that contains at least one compound of the group of compounds represented by the structures of each of the following Formulas (I), (II) and (III),

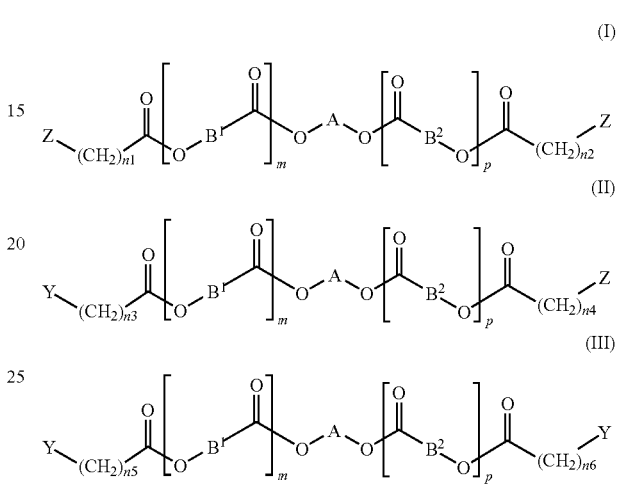

wherein
Z is F, Cl, Br, I, —OTs, —OTf, —OMs, CN, or $NO_2$;
Y is H, F, Cl, Br, I, —OTs, —OTf, —OMs, CN, or $NO_2$;
with the proviso that Z is not equal to Y;
$n1$, $n2$, $n3$, $n4$, $n5$, and $n6$ are each independently integers 3 to 20;
m and p are each independently integers 0, 1, or 2;
A is a divalent radical selected from the group:

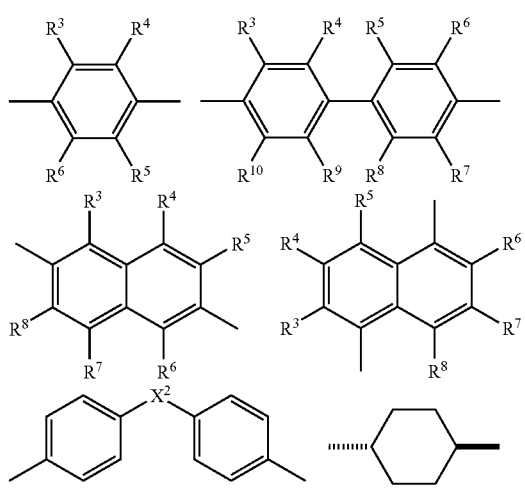

wherein $R^3$ through $R^{10}$ are each independently selected from the group: H, $C_1$ to $C_8$ straight or branched chain alkyl, $C_1$ to $C_8$ straight or branched chain alkyloxy, F, Cl, phenyl, —C(O)$CH_3$, CN, and $CF_3$; $X^2$ is a divalent radical selected from the group: —O—, —$(CH_3)_2$C—, and —$(CF_3)_2$C—; and each $B^1$ and $B^2$ is a divalent radical independently selected from the group: $R^{11}$-substituted-1,4-phenyl, wherein $R^{11}$ is H, —$CH_3$ or —$OCH_3$; 2,6-naphthyl; and 4,4'-biphenyl; with the proviso that when m+p is equal to 3 or 4, at least two of $B^1$ and $B^2$ are $R^{11}$-substituted-1,4-phenyl.

Another embodiment of the invention is a liquid crystal composition comprising at least one compound of each of the Formulas (I), (II), and (III), and in a further embodiment the liquid crystal composition comprises at least one chiral compound.

Another embodiment of the invention is an article comprising the liquid crystal composition, and in a further embodiment the article is fabricated as an optical element.

Another embodiment of the inventions hereof is a process for preparing a composition by (a) providing one or more organic polyol(s) comprising at least two hydroxyl groups and at least two covalently bonded carbon atoms, each hydroxyl group being bonded to a different carbon atom within an organic polyol;

(b) reacting the organic polyol(s), optionally in the presence of a base, with (i) one or more functionalized alkyl acid(s) or acid halide(s) represented by the structure of the following Formula (X):

$$Z-(CH_2)_n-C(O)X \quad (X)$$

wherein X is Cl, Br, I, or OH; Z is F, Cl, Br, I, —OTs, —OTf, —OMs, CN, or $NO_2$; and n is an integer equal to 3 to 20; and (ii) one or more non-functionalized alkyl acid(s) or acid halide(s) represented by the structure of the following Formula (XI):

$$Y-(CH_2)_t-C(O)X \quad (XI)$$

wherein X is Cl, Br, I, or OH; Y is H, F, Cl, Br, I, —OTs, —OTf, —OMs, CN, or $NO_2$; and t is an integer equal to 3 to 20;

with the proviso that Z is not equal to Y; in a reaction solvent and at a reaction temperature to provide a mixture comprising the composition and a spent reaction mixture.

In another embodiment, the invention provides a composition as prepared by the process disclosed above; and in another embodiment, the composition prepared by the process disclosed above comprises at least one compound of each of the Formulas (I), (II) and (III).

The composition as described herein has a variety of uses in liquid crystal compositions. Choices may be made from within and among the prescribed ranges for the variable radicals and substituents such that each compound of the composition is, for example, either symmetric or asymmetric.

DETAILED DESCRIPTION

One embodiment of the inventions hereof provides a composition comprising at least one compound of each of the Formulas (I), (II) and (III), (I)

(II)

(III)

wherein
Z is F, Cl, Br, I, —OTs, —OTf, —OMs, CN, or $NO_2$;
Y is H, F, Cl, Br, I, —OTs, —OTf, —OMs, CN, or $NO_2$;
with the proviso that Z is not equal to Y;
n1, n2, n3, n4, n5, and n6 are each independently integers 3 to 20;
m and p are each independently integers 0, 1, or 2; and
A is a divalent radical selected from the group:

wherein $R^3$ through $R^{10}$ are each independently selected from the group: H, $C_1$ to $C_8$ straight or branched chain alkyl, $C_1$ to $C_8$ straight or branched chain alkyloxy, F, Cl, phenyl, —C(O)$CH_3$, CN, and $CF_3$; $X^2$ is a divalent radical selected from the group: —O—, —$(CH_3)_2$—, and —$(CF_3)_2$C—; and each $B^1$ and $B^2$ is a divalent radical independently selected from the group: $R^{11}$-substituted-1,4-phenyl, wherein $R^{11}$ is H, —$CH_3$ or —$OCH_3$; 2,6-naphthyl; and 4,4'-biphenyl; with the proviso that when m+p is equal to 3 or 4, at least two of $B^1$ and $B^2$ are $R^{11}$-substituted-1,4-phenyl.

The abbreviation "—OTf", as used herein, refers to a functional group with the formula $CF_3SO_3$—, which is also referred to as a triflate or trifluoromethanesulfonate group. The abbreviation "—OTs", as used herein, refers to a functional group with the formula $CH_3C_6H_4SO_3$—, which is also referred to as a tosylate group. The abbreviation "—OMs", as used herein, refers to a functional group with the formula $CH_3SO_3$—, which is also referred to as a mesylate or methanesulfonate group.

In the phrase "each $B^1$ and $B^2$ is a divalent radical independently selected from the group . . . ", when m=2, the two $B^1$ units are each selected independently, that is they may be the same or different; and when p=2, the two $B^2$ units are each selected independently, that is they may be the same or different. In addition, a $C_1$-$C_8$ group may be any one or more of $C_1$, $C_2$, $C_3$, $C_4$, $C_5$, $C_6$, $C_7$ or $C_8$. Throughout the specification, in Formulas (I), (II), (III), when -A- is a trans-cyclohexyl moiety and one or both of m and p is an integer equal to 0, the term "aryl alkanoate ester(s)" can refer to cyclohexyl alkanoate ester(s).

For each compound of the composition, n1, n2, n3, n4, n5, and n6 may each be independently integers 3 to 10. For each compound of the composition, when m and p=2, $B^1$ and $B^2$ may each be independently $R^{11}$-substituted-1,4-phenyl.

In one embodiment, Z is Br, I, —OTs, —OTf, or —OMs, and Y is H, Br, I, —OTs, —OTf, or —OMs. In another embodiment, Z is Br and Y is H. In another embodiment, for at least one compound of each of the Formulas (I), (II), (III) of the composition, m is 0 and p is 0. In another embodiment, for at least one compound of each of the Formulas (I), (II), (III) of the composition, m is 1 and p is 0. In another embodiment, for at least one compound of each of the Formulas (I), (II), (III) of the composition, m is 1 and p is 1. In another embodiment, for at least one compound of each of the Formulas (I), (II), (III) of the composition, m is 1 and p is 0, and for at least one compound of each of the Formulas (I), (II), (III) of the composition, m is 1 and p is 1. In another embodiment, n1, n2, and n4 are the same. In another embodiment, the composition comprises only one compound of Formula (I). In another embodiment, the composition comprises only one compound of Formula (I) and n1, n2, and n4 are the same.

Another embodiment of the invention is a composition comprising at least one compound of each of the Formulas (I), (II), and (III), wherein for at least one compound of each of the Formulas (I), (II) and (III), m is 0 and p is 0, and, Formula (I) is selected from the group compounds represented by the structures of the following Formulas (VIIa-VIIf):

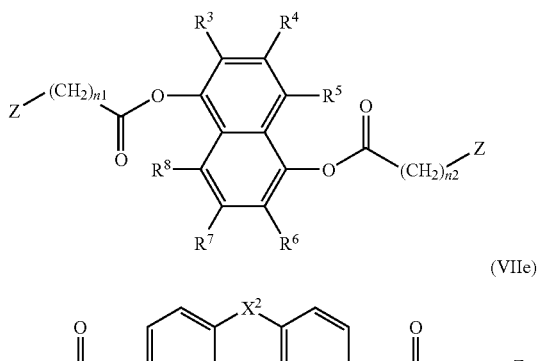

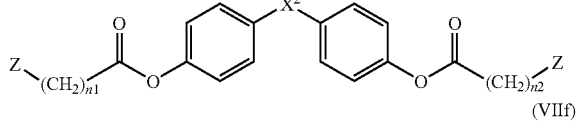

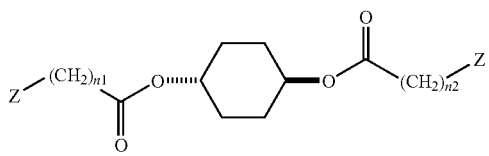

In this embodiment, Formula (II) is selected from the group of compounds represented by the structures of the following Formulas (XVIIa-XVIIf):

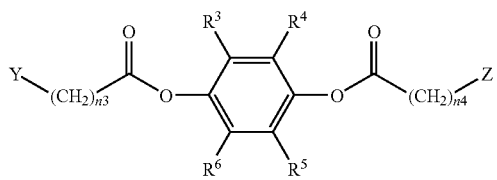

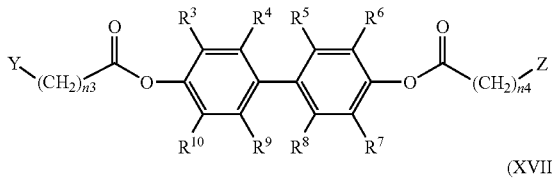

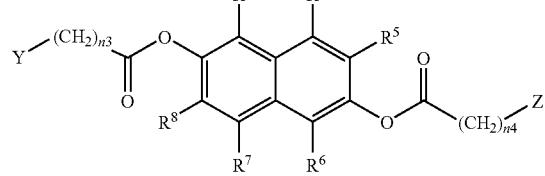

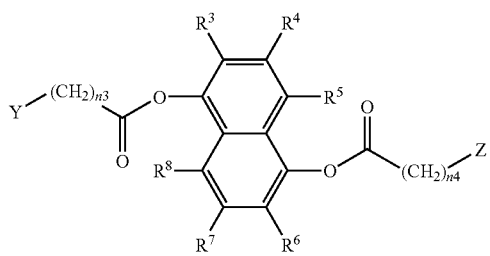

(XVIIe)

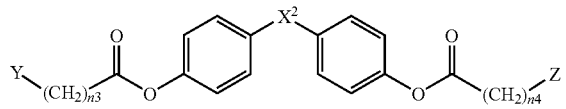

(XVIIf)

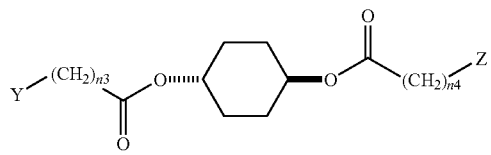

and Formula (III) is selected from the group of compounds represented by the structures of the following Formulas (XVIIIa-XVIIIf):

(XVIIIa)

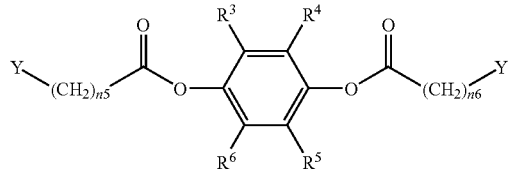

(XVIIIb)

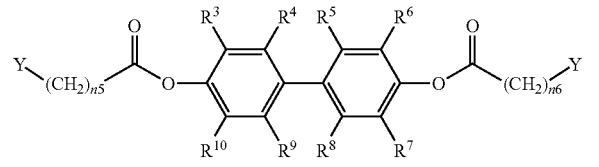

(XVIIIc)

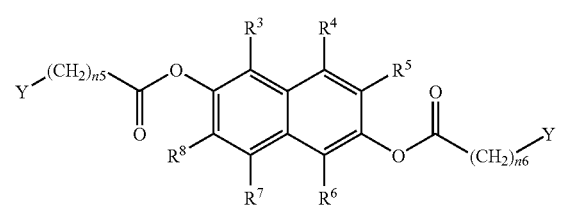

(XVIIId)

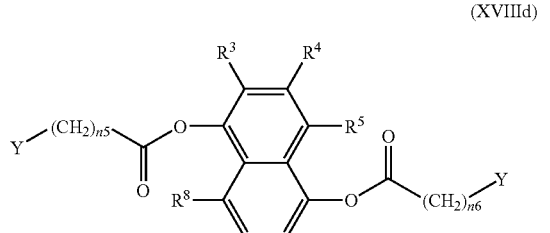

(XVIIIe)

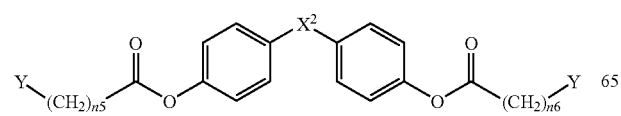

(XVIIIf)

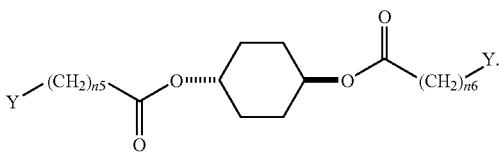

Compositions comprising at least one compound of each of the Formulas (VIIa-VIIf), (XVIIa-XVIIf), and (XVIIIa-XVIIIf) are useful as diluents and viscosity modifiers for liquid crystal compositions. Methods for synthesizing these compositions are described below. Preferred compositions comprise at least one compound as described in Formulas (VIIa-VIId) wherein $R^3$-$R^8$ are H; in Formula (VIIa) wherein $R^3$-$R^5$ are H and $R^6$ is $CH_3$; and in Formula (VIIe) wherein $X^2$ is —C($CH_3$)$_2$— or —O—.

Another embodiment of the invention is a composition comprising at least one compound of each of the Formulas (I), (II) and (III), wherein for at least one compound of each of the Formulas (I), (II) and (III), m is 1 and p is 0, and Formula (I) is selected from the group of compounds represented by the structures of the following Formulas (VIIIa-VIIIe):

(VIIIa)

$$Z-(CH_2)_{n1}\overset{O}{\underset{}{\text{—}}}O-B^1\overset{O}{\underset{}{\text{—}}}O\underset{R^6\ R^5}{\overset{R^3\ R^4}{\bigcirc}}O\overset{O}{\underset{}{\text{—}}}(CH_2)_{n2}Z$$

(VIIIb)

(VIIIc)

(VIIId)

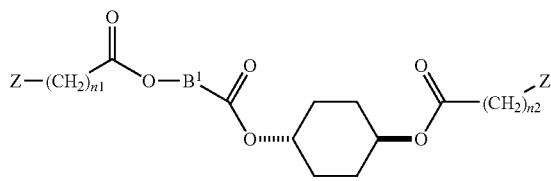
(VIIIe)

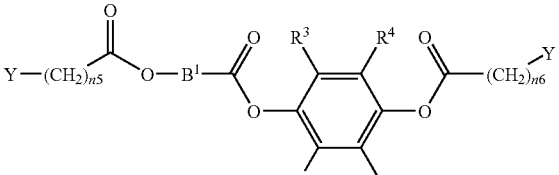
(XXa)

In this embodiment, Formula (II) is selected from the group of compounds represented by the structures of the following Formulas (XIXa-XIXe):

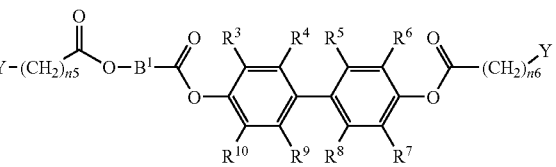
(XXb)

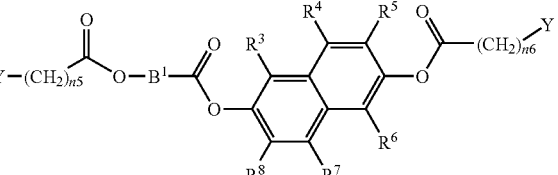
(XXc)

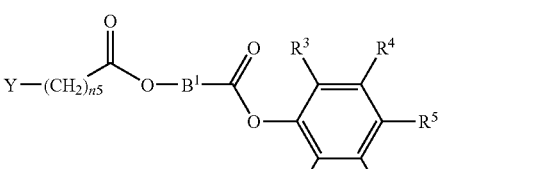
(XXd)

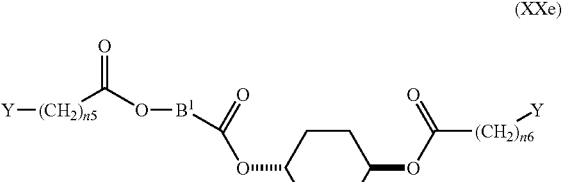
(XIXa)

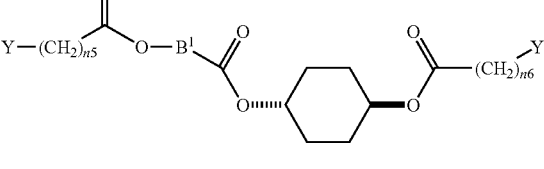
(XXe)

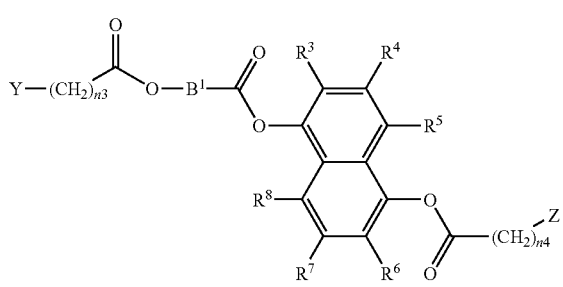
(XIXb), (XIXc), (XIXd)

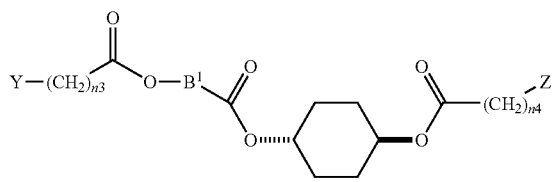
(XIXe)

and Formula (III) is selected from the group of compounds represented by the structures of the following Formulas (XXa-XXe):

Compositions comprising at least one compound of each of the Formulas (VIIIa-VIIIe), (XIXa-XIXe), and (XXa-XXe) are useful in liquid crystal compositions. Such compositions, when comprising at least one compound as described in Formula (VIIIa-VIIIe), exhibit nematic phases at or near room temperature (RT, about 25° C.). Other liquid crystal monomers can be added to the composition to provide nematic phases over broad temperature ranges. Other compounds within this group may exhibit low melting points and can be used as reactive diluents and viscosity modifiers in liquid crystal mixtures. Preferred compositions comprise at least one compound as described in Formula (VIIIa) wherein $R^3$-$R^6$ is H. Methods for synthesizing these compositions are described below.

Another embodiment of the invention is a composition comprising at least one compound of each of the Formulas (I), (II), and (III), wherein for at least one compound of each of the Formulas (I), (II), and (III), m is 1 and p is 1, and Formula (I) is selected from the group of compounds represented by the structures of the following Formulas (IXa-IXe):

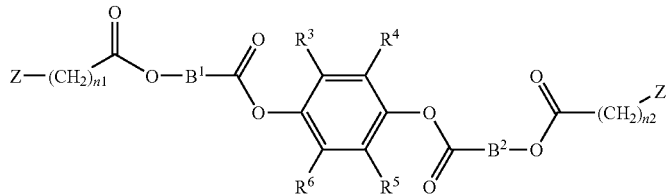
(IXa)
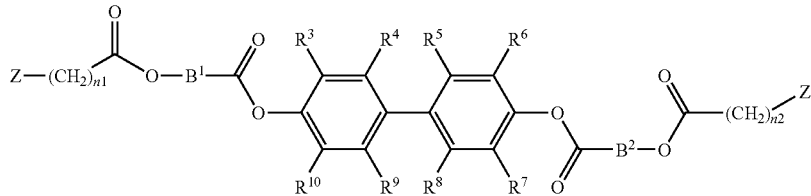
(IXb)
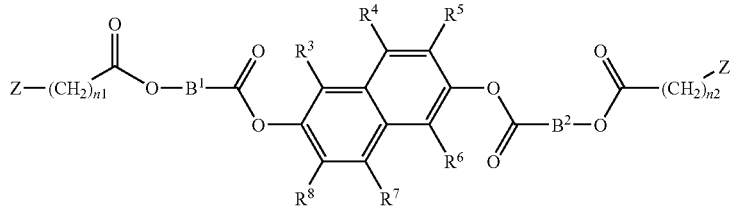
(IXc)
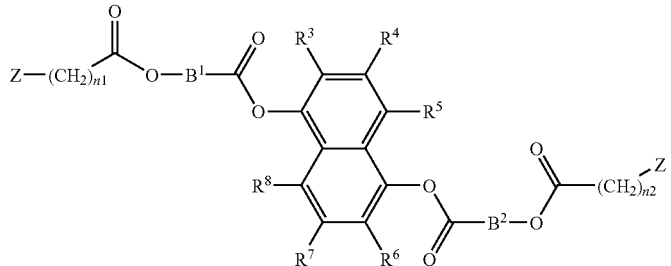
(IXd)
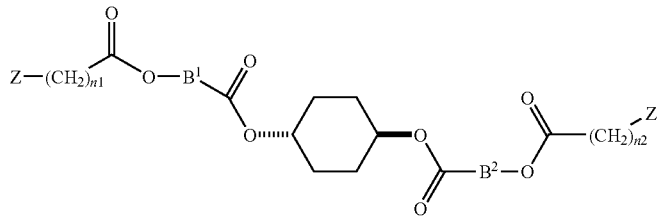
(IXe)
In this embodiment, Formula (II) is selected from the group of compounds represented by the structures of the following Formulas (XXIa-XXIe):
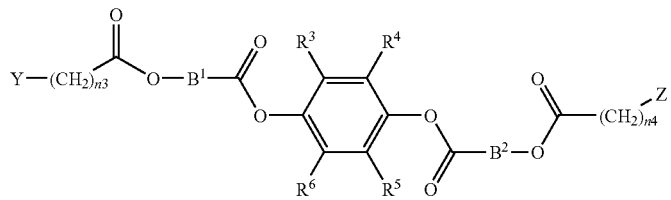
(XXIa)

(XXIb)
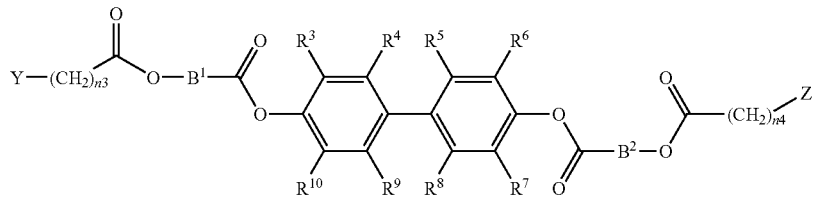
(XXIc)
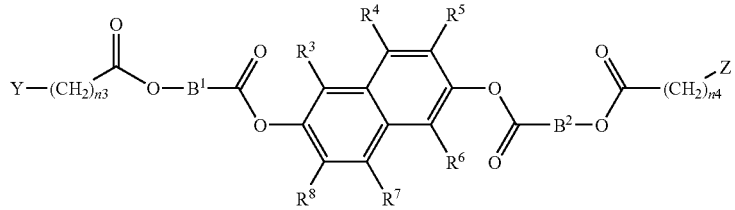
(XXId)
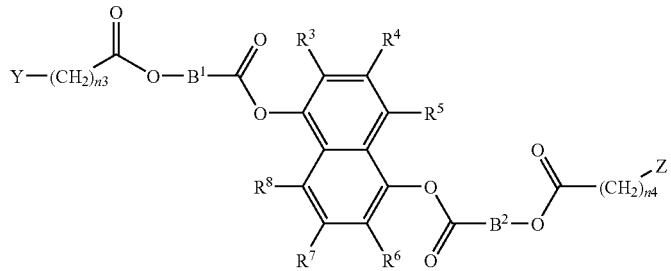
(XXIe)
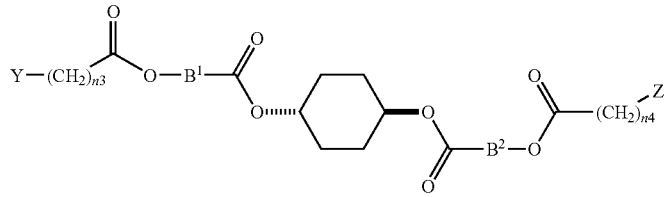
and Formula (III) is selected from the group of compounds represented by the structures of the following Formulas (XXIIa-XXIIe):
(XXIIa)
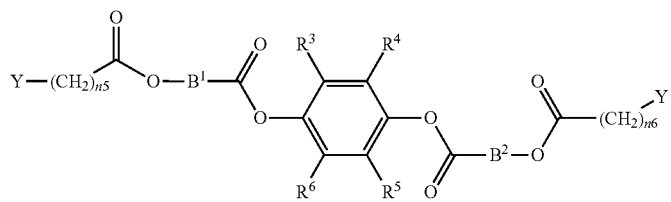
(XXIIb)
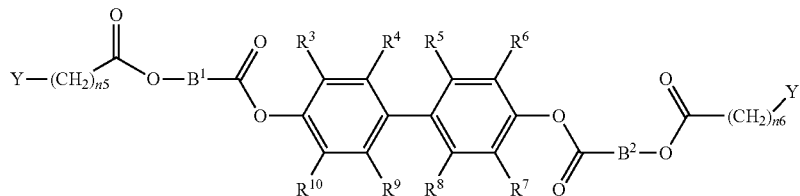

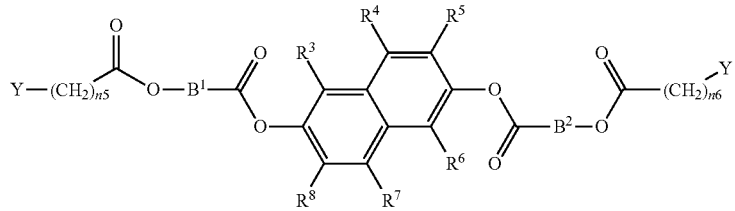

(XXIIc)

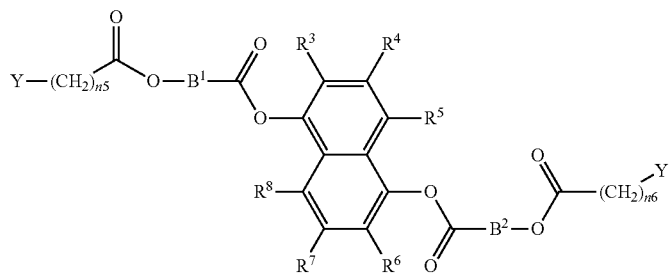

(XXIId)

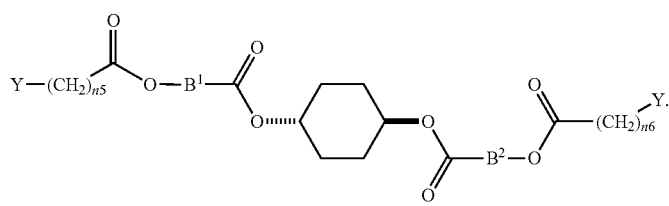

(XXIIe)

Compositions comprising at least one compound of each of the Formulas (IXa-IXe), (XXIa-XXIe), and (XXIIa-XXIIe) are useful in liquid crystal compositions. Such compositions, when comprising at least one compound as described in Formula (IXa-IXe), exhibit nematic phases over broad temperature ranges. Other liquid crystal monomers can be added to the composition to provide nematic phases over broad temperature ranges. Preferred compositions comprise at least one compound as described in Formula (IXa) wherein $B^1$ and $B^2$ are $R^{11}$-substituted-1,4-phenyl. Within this group of compositions, a more preferred composition further comprises at least one compound wherein one of the group $R^3$-$R^6$ is Cl or $CH_3$; and three of the group $R^3$-$R^6$ are H— as shown, for example, in the following Formula (XXIII):

or near room temperature (RT). Other liquid crystal monomers can be added to the composition to provide nematic phases over broad temperature ranges. Preferred compositions comprise at least one compound as described in Formula (VIIIa) and/or Formula (IXa) wherein $R^3$-$R^6$ is H. Other preferred compositions comprise at least one compound of Formula (XXIII). Other preferred compositions comprise at least one compound as described in Formula (VIIIa) and/or Formula (IXa) wherein one of the groups $R^3$-$R^6$ is $CH_3$; and three of the groups $R^3$-$R^6$ are H. Methods for synthesizing these compositions are described below.

In another embodiment, the total amount of compounds of Formula (I) are present in the range of about 0.1 mole percent to about 95 mole percent based on the total content of the (XXIII)

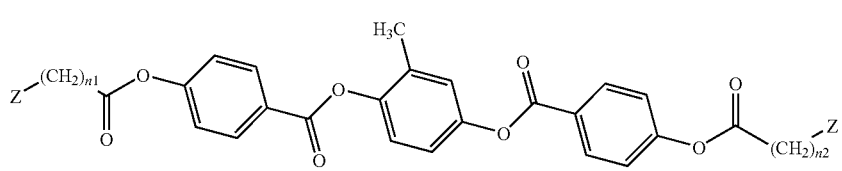

Within these preferred compositions, more preferred are those comprising compounds wherein n1 and n2 are, independently, integers 3 to 10. Methods for synthesizing these compositions are described below.

Another embodiment of the invention is a composition comprising at least one compound of each of the Formulas (I), (II) and (III), wherein for at least one compound of each of the Formulas (I), (II) and (III), m is 1 and p is 0; and wherein for at least one compound of each of the Formulas (I), (II) and (III), m is 1 and p is 1. Such compositions can be useful in liquid crystal compositions and can exhibit nematic phases at composition. In another embodiment, the total amount of compounds of Formula (I) are present in the range of about 5 mole percent to about 95 mole percent based on the total content of the composition. In another embodiment, the total amount of compounds of each of Formula (I) are present in the range of about 20 mole percent to about 80 mole percent based on the total content of the composition.

In another embodiment, the total amount of compounds of Formula (II) are present in the range of about 5 mole percent to about 50 mole percent, based on the total content of the composition. In another embodiment, the total amount of compounds of Formula (II) are present in the range of about 10 mole percent to about 50 mole percent based on the total content of the composition.

In another embodiment, the total amount of compounds of Formula (III) are present in the range of about 0.1 mole percent to about 90 mole percent based on the total content of the composition. In another embodiment, the total amount of compounds of Formula (III) are present in the range of about 0.1 mole percent to about 60 mole percent based on the total content of the composition.

When the compositions of this invention are prepared by one embodiment of a process hereof (such as is disclosed below), rather than by synthesizing each compound individually and then combining them to form the desired composition, one result of the use of that embodiment of the process is that the relative amounts of the compounds of each of the Formulas (I), (II) and (III) in the composition will be determined by a fixed relationship that is given effect by the process. When the composition is prepared by that embodiment of a process hereof, a desired amount of the compounds of one of Formulas (I), (II) or (III) is pre-selected, and an appropriate ratio of the reactants is employed to produce the desired amount of the compounds of that Formula. The ratio of reactants selected to produce the desired amount of one of the Formula (II), (II) or (III) compounds will, however, also produce an amount of the other two compounds that adheres to the fixed relationship. For example, in this embodiment of the process, the amount of each of the Formula (I), (II) or (III) compounds that is produced in relation to the amount of leaving groups used in the reactants will adhere to a fixed relationship that may be determined in advance.

The choice of what amount to pre-select for which of the compounds of the Formulas (I), (II) or (III) depends on the desired end use of the composition, for example the degree of flexibility or brittleness desired. The preparation by a process hereof of the compositions hereof, which comprise at least one compound of each of the Formulas (I), (II) and (III), can thus provide advantages over compositions comprising a single compound, compositions comprising compounds of less than all of the Formulas (I), (II) and (III), or compositions prepared by blending separately made compounds because the physical properties of the compositions hereof may thus be tuned by adjusting the relative percentage content of each of the Formula (I), (II) and (III) compounds. For example, the rate of crystallization, the thermal characteristics, or the degree of crosslinking (and thus the flexibility or brittleness) of a composition hereof may be adjusted in such manner.

Another embodiment of the invention hereof provides a process for preparing a composition which comprises at least one compound of each of the Formulas (I), (II) and (III). In one embodiment, the process comprises (a) providing one or more organic polyol(s) comprising at least two hydroxyl groups and at least two covalently bonded carbon atoms, each hydroxyl group being bonded to a different carbon atom within an organic polyol; and (b) reacting the organic polyol(s), optionally in the presence of a base, with (i) one or more functionalized alkyl acid(s) or alkyl acid halide(s) as represented by the structure of the following Formula (X):

$$Z-(CH_2)_n-C(O)X \qquad (X)$$

wherein X is Cl, Br, I, or OH; Z is F, Cl, Br, I, —OTs, —OTf, —OMs, CN, or $NO_2$; and n is an integer equal to 3 to 20; and (ii) one or more non-functionalized alkyl acid(s) or acid halide(s) as represented by the structure of the following Formula (XI):

$$Y-(CH_2)_t-C(O)X \qquad (XI)$$

wherein X is Cl, Br, I, or OH; Y is H, F, Cl, Br, I, —OTs, —OTf, —OMs, CN, or $NO_2$; and t is an integer equal to 3 to 20; with the proviso that Z is not equal to Y; in a reaction solvent and at a reaction temperature to provide a mixture comprising at least one compound of each of the Formulas (I), (II), and (III), as described above, and a spent reaction mixture. Preferably, when X is OH, the process further comprises the use of a carbodiimide dehydrating agent.

In various embodiments of the processes of the invention, the polyol(s) may be selected from the group of compounds represented by the structures of the following Formulas (XIIa-XIIf):

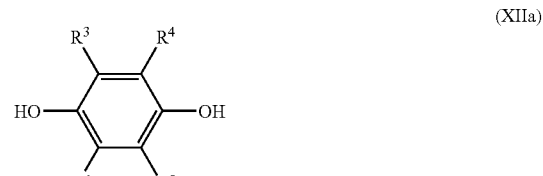

(XIIa)

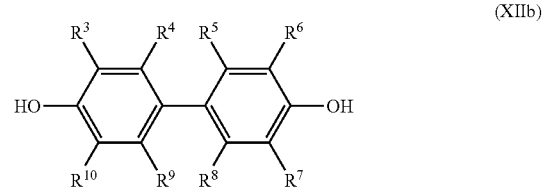

(XIIb)

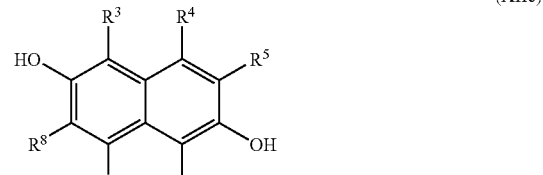

(XIIc)

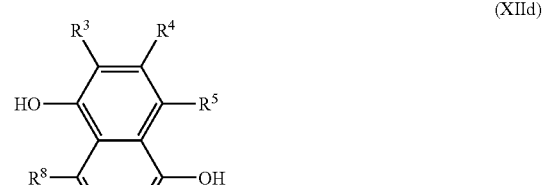

(XIId)

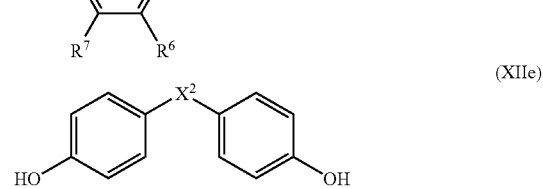

(XIIe)

(XIIf)

wherein $R^3$-$R^{10}$ and $X^2$ are as described above. These embodiments of the process can be used to provide compositions comprising compounds of Formula (VIIa-VIIf) as described above. Specific diols of Formula (XIIa-XIIf) useful and preferred in the process include: hydroquinone, methylhydroquinone, chlorohydroquinone, 4,4'-dihydroxybiphenyl, 2,6-dihydroxynapthalene, 1,5-dihydroxynapthalene, Bisphenol A, 6F-Bisphenol A, 4,4'-oxydiphenol, and trans-1,4-cyclohexanediol.

In other embodiments of the processes hereof, the polyol(s) may include one or more ester diols selected from the group of compounds represented by the structures of the following Formulas (XIIIa-XIIIg):

(XIIIa)
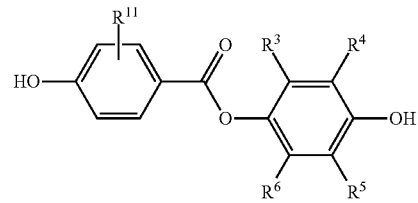

(XIIIb)
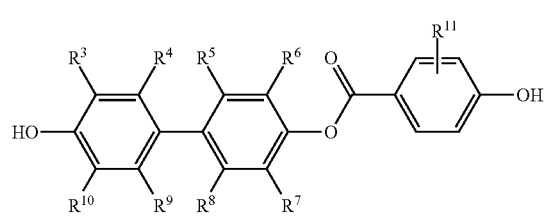

(XIIIc)
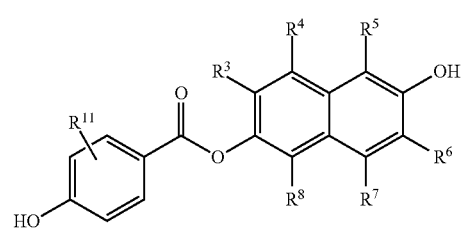

(XIIId)
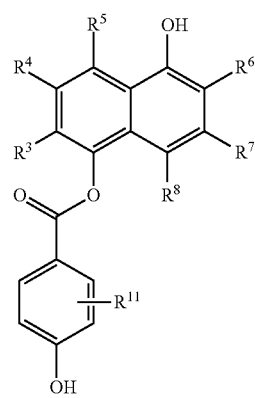

(XIIIe)
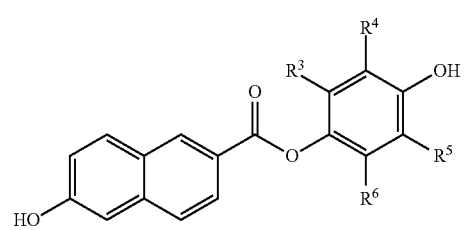

(XIIIf)
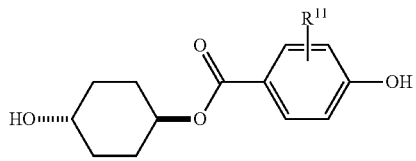

(XIIIg)
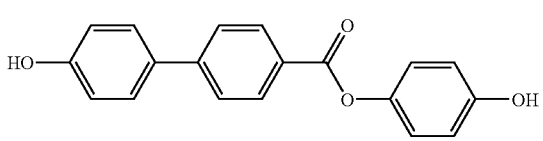

wherein $R^3$-$R^{11}$ are as described above. These embodiments of the process can be used to provide compositions comprising compounds of Formulas (VIIIa-VIIIe) as described above. Specific ester diols of Formulas (XIIIa-XIIIg) useful and preferred in the process include: 4-hydroxyphenyl 4-hydroxybenzoate, 2-methyl-4-hydroxyphenyl 4-hydroxybenzoate, 3-methyl-4-hydroxyphenyl 4-hydroxybenzoate, 2-chloro-4-hydroxyphenyl 4-hydroxybenzoate, 3-chloro-4-hydroxyphenyl 4-hydroxybenzoate, 2-fluoro-4-hydroxyphenyl 4-hydroxybenzoate, 3-fluoro-4-hydroxyphenyl 4-hydroxybenzoate, 2-phenyl-4-hydroxyphenyl 4-hydroxybenzoate, 3-phenyl-4-hydroxyphenyl 4-hydroxybenzoate, 6-hydroxynaphthyl 4-hydroxybenzoate, 5-hydroxynaphtyl 4-hydroxybenzoate, 4-(4'-hydroxybiphenyl) 4-hydroxybenzoate, trans-4-hydroxycyclohexyl 4-hydroxybenzoate, trans-4-hydroxycyclohexyl 4-hydroxy-3-methoxybenzoate, 4-hydroxyphenyl 4-hydroxy-3-methoxybenzoate, 2-methyl-4-hydroxyphenyl 4-hydroxy-3-methoxybenzoate, 3-methyl-4-hydroxyphenyl 4-hydroxy-3-methoxybenzoate, 2-chloro-4-hydroxyphenyl 4-hydroxy-3-methoxybenzoate, 3-chloro-4-hydroxyphenyl 4-hydroxy-3-methoxybenzoate, 4-hydroxyphenyl 4-hydroxy-3-methylbenzoate, 2-methyl-4-hydroxyphenyl 4-hydroxy-3-methylbenzoate, and 3-methyl-4-hydroxyphenyl 4-hydroxy-3-methylbenzoate.

Other ester diols useful and preferred in the processes that provide compositions comprising specific compounds as described by Formula (XIIIe) derived from 6-hydroxy-2-napthalene carboxylic acid are: 6-hydroxynapthalene-2-carboxylic acid 4-hydroxyphenyl ester (CAS No. [17295-17-9]), 6-hydroxynapthalene-2-carboxylic acid 2-methyl-4-hydroxyphenyl ester, 6-hydroxynapthalene-2-carboxylic acid 3-methyl-4-hydroxyphenyl ester, 6-hydroxynapthalene-2-carboxylic acid 2-chloro-4-hydroxyphenyl ester, and 6-hydroxynapthalene-2-carboxylic acid 3-chloro-4-hydroxyphenyl ester.

Other ester diols useful and preferred in the processes that provide compositions comprising specific compounds as described in Formula (XIIIg) derived from 4'-hydroxy-4-biphenyl carboxylic acid include: 4'-hydroxybiphenyl-4-carboxylic acid 4-hydroxyphenyl ester, 4'-hydroxybiphenyl-4-carboxylic acid 2-methyl-4-hydroxyphenyl ester, 4'-hydroxybiphenyl-4-carboxylic acid 3-methyl-4-hydroxyphenyl ester, 4'-hydroxybiphenyl-4-carboxylic acid 2-chloro-4-hydroxyphenyl ester, and 4'-hydroxybiphenyl-4-carboxylic acid 3-chloro-4-hydroxyphenyl ester.

In other embodiments of the processes hereof, the polyol(s) may include one or more diester diol(s) selected from the group of compounds represented by the structures of the following Formulas (XIVa-XIVf):

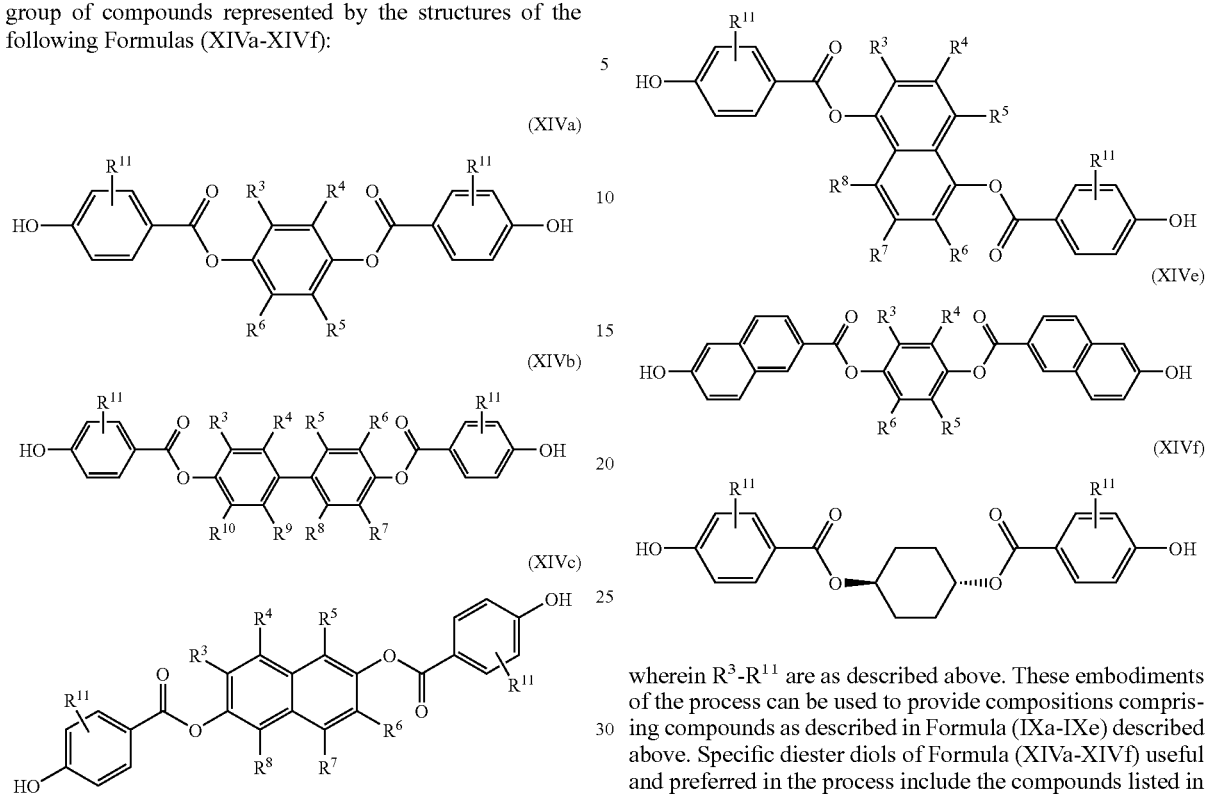

wherein $R^3$-$R^{11}$ are as described above. These embodiments of the process can be used to provide compositions comprising compounds as described in Formula (IXa-IXe) described above. Specific diester diols of Formula (XIVa-XIVf) useful and preferred in the process include the compounds listed in Table 1 that are specific examples of compounds of Formula (XIVa-XIVf).

TABLE 1

Examples of Diester Diols of Formula (XIVa-f)

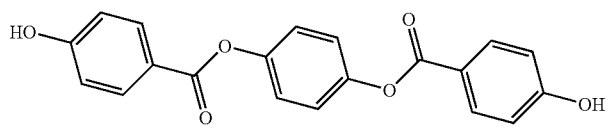

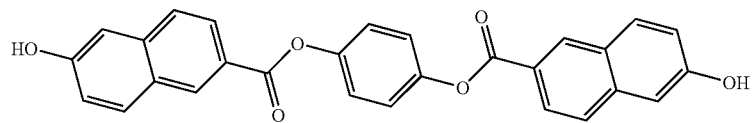

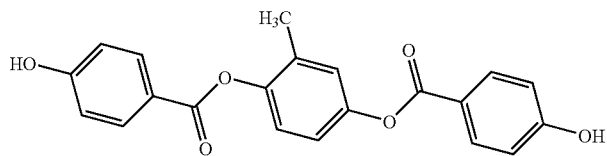

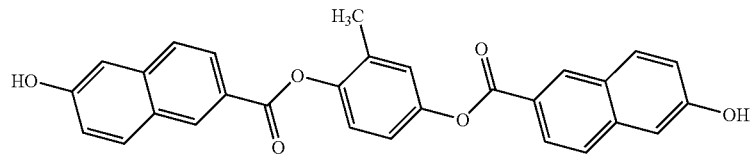

TABLE 1-continued
Examples of Diester Diols of Formula (XIVa-f)
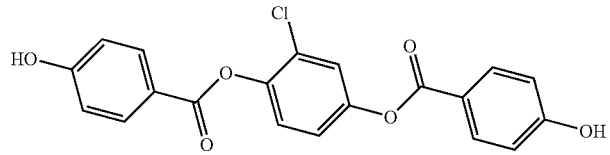
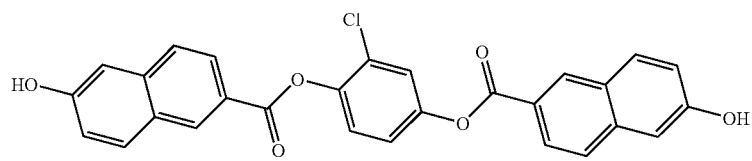
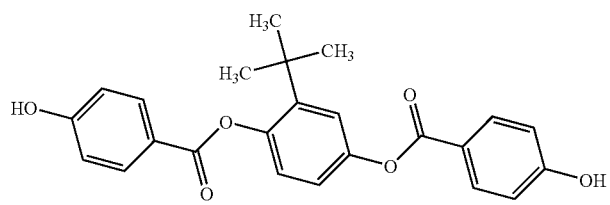
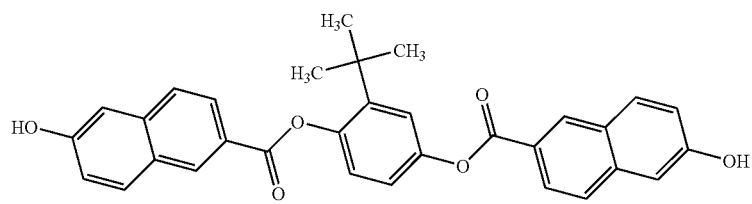
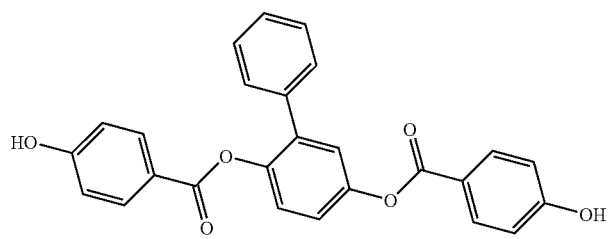
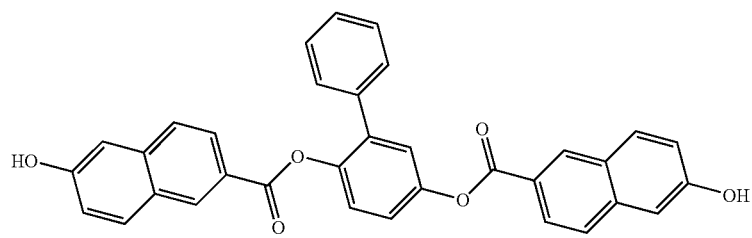
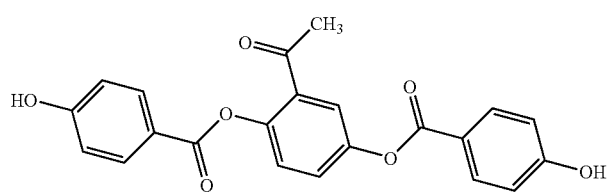

TABLE 1-continued
Examples of Diester Diols of Formula (XIVa-f)
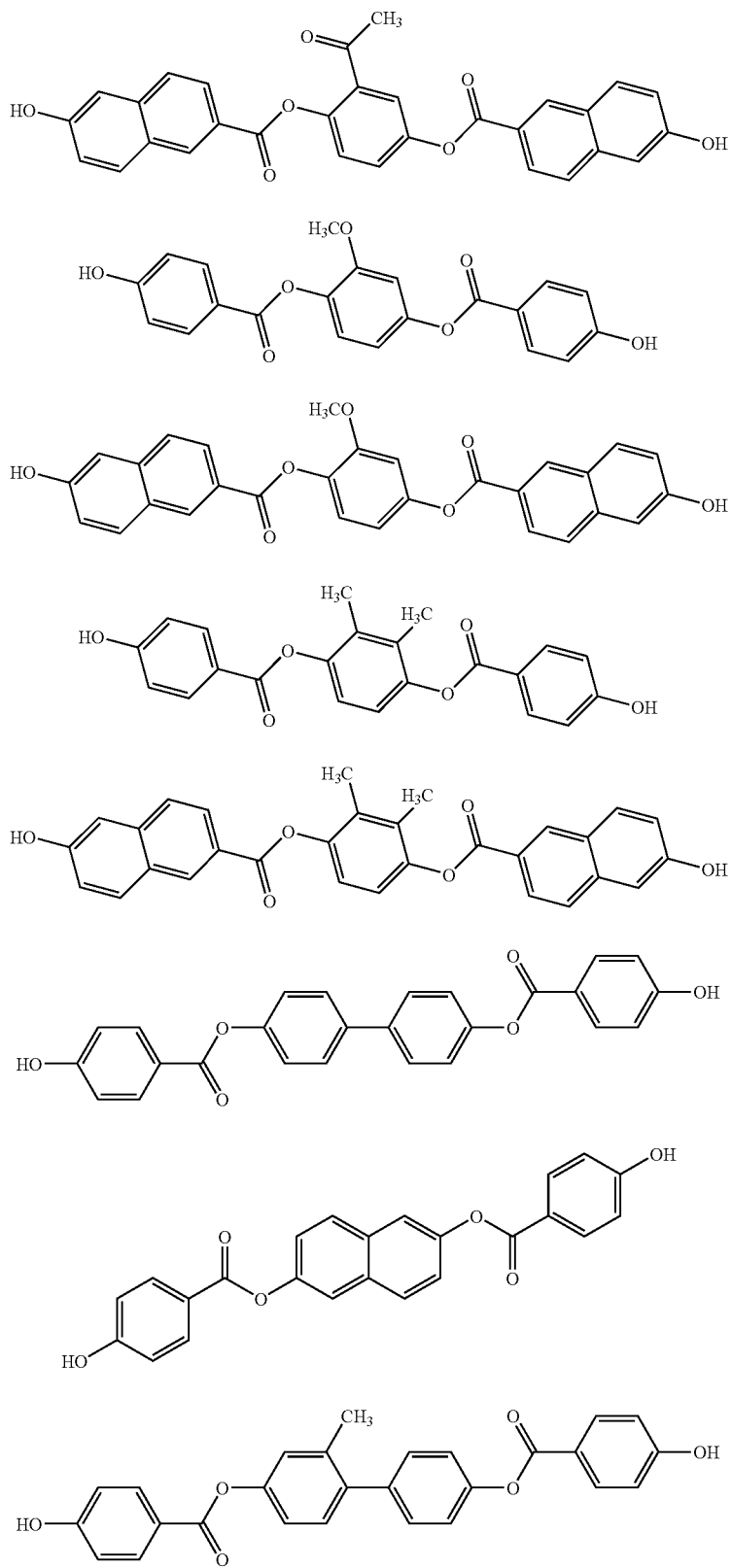

TABLE 1-continued

Examples of Diester Diols of Formula (XIVa-f)

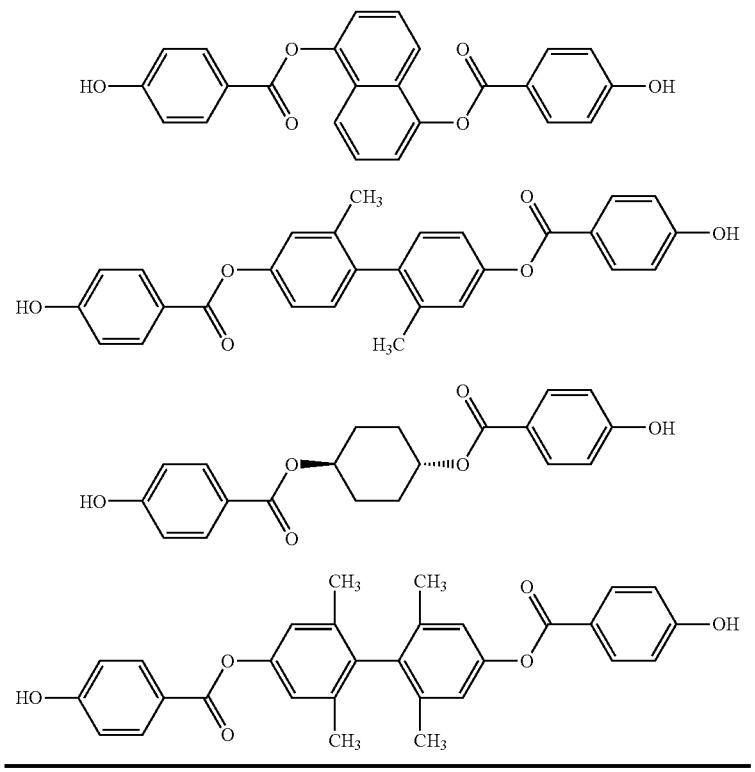

Using a mixture of two or more polyols is one means to increase the complexity of the product distribution of the resulting composition. This can be a way to tune the properties of the composition or the properties of its end use. The polyols can be selected to provide a composition having two or more mesogens, for example a composition wherein for at least one compound of each of the Formulas (I), (II) and (III) m is 1 and p is 0, and wherein for at least one compound of each of the same Formulas m is 1 and p is 1. Other combinations of polyols can also be used.

Preferred functionalized alkyl acid halide(s) as described in Formula (X) are acid chlorides (X=Cl). In one embodiment, in Formula (X) Z is Br, I, —OTs, —OTf, or —OMs. Preferred non-functionalized alkyl acid halide(s) as described in Formula (XI) are acid chlorides (X=Cl). In one embodiment, in Formula (XI) Y is H, Br, I, —OTs, —OTf, or —OMs. In one embodiment, in Formula (X) Z is Br and in Formula (XI) Y is H.

When the organic polyol is a diol, the total amount of the functionalized alkyl acid halide(s) and the non-functionalized alkyl acid halide(s) is preferably about 1.8 to about 2.5 equivalents, and more preferably about 2.0 equivalents, based on the amount of the diol. The relative amounts of the functionalized and non-functionalized alkyl acid halides used determine the relative amounts of the compounds of Formulas (I), (II) and (III) obtained in the composition. For example, a 1:1 mixture (on a mole basis) of a functionalized and a non-functionalized alkyl acid halide provides a composition wherein the relative molar amounts of the compounds of Formulas (I), (II) and (III) are 1:2:1, respectively. Alternatively, a 4:1 mixture (on a mole basis) of a functionalized and a non-functionalized alkyl acid halide (for example, 1.6 equivalents of a functionalized and 0.4 equivalents of a non-functionalized alkyl acid halide, relative to the diol) results in a composition having 64 mol % compounds of Formula (I), 32 mol % compounds of Formula (II), and 4 mol % compounds of Formula (III). For a particular ratio of functionalized to non-functionalized alkyl acid halide(s), the distribution of products is a statistical mixture of all the possibilities. Increasing the total number of functionalized and/or non-functionalized alkyl acid halides is one means to increase the complexity of the product distribution, ie. the number of compounds of each of Formulas (I), (II) and (III), of the resulting composition.

In another embodiment, the relative amounts of the functionalized and non-functionalized alkyl acid halides are selected to provide a composition comprising at least one compound of each of the Formulas (I), (II) and (III), wherein the total amount of compounds of Formula (I) are present in the range of about 0.1 mole percent to about 95 mole percent based on the total content of the composition. In another embodiment, the relative amounts of the functionalized and non-functionalized alkyl acid halides are selected to provide a composition wherein the total amount of compounds of Formula (I) are present in the range of about 5 mole percent to about 95 mole percent based on the total content of the composition. In another embodiment, the relative amounts of the functionalized and non-functionalized alkyl acid halides are selected to provide a composition wherein the total amount of compounds of Formula (I) are present in the range of about 20 to about 80 mole percent based on the total content of the composition.

In another embodiment, the relative amounts of the functionalized and non-functionalized alkyl acid halides are selected to provide a composition comprising at least one compound of each of the Formulas (I), (II) and (III), wherein the total amount of compounds of Formula (II) are present in the range of about 5 mole percent to about 50 mole percent based on the total content of the composition. In another embodiment, the relative amounts of the functionalized and non-functionalized alkyl acid halides are selected to provide a composition wherein the total amount of compounds of Formula (II) are present in the range of about 10 to about 50 mole percent based on the total content of the composition.

In another embodiment, the relative amounts of the functionalized and non-functionalized alkyl acid halides are selected to provide a composition comprising at least one compound of each of the Formulas (I), (II) and (III), wherein the total amount of compounds of Formula (III) are present in the range of about 0.1 mole percent to about 90 mole percent based on the total content of the composition. In another embodiment, the relative amounts of the functionalized and non-functionalized alkyl acid halides are selected to provide a composition wherein the total amount of compounds of Formula (III) are present in the range of about 0.1 mole percent to about 60 mole percent based on the total content of the composition.

This process, or derivations thereof using several functionalized alkyl acid halides in conjunction with several non-functionalized alkyl acid halides, is a convenient and preferred process to provide complex mixtures of the composition.

The reaction solvent can be any solvent known in the art to be useful in performing acid halide condensations with alcohols, including alkyl ethers such as tetrahydrofuran (THF), dioxane or dimethoxyethane; alkyl esters such as ethyl acetate or butyl acetate; hydrocarbons such as xylenes or toluene; halogenated hydrocarbons such as 1,2-dichloroethane or dichloromethane; and amides such as dimethylformamide or dimethylacetamide (DMAc). A preferred reaction solvent is THF.

The reaction temperature is a temperature that gives a reasonable rate of reaction with a minimum of by-products. The reaction temperature generally is between −30° C. and about 50° C., and preferably about 0° C. to about room temperature (RT, e.g. 25° C.).

A base, when optionally used in step (b), can include an inorganic base, for instance an alkali metal or alkali earth metal hydroxide, carbonate or bicarbonate; or an organic base such as an amine base that has at least two aliphatic groups, or in which the N atom is in a cycloaliphatic or aromatic ring, substituted in a manner that induces steric crowding around the N atom. Typically the amine base will be of low water solubility and have a $pK_a$ of the conjugate acid of about 10. Thus, it may be a heteroaromatic base such as pyridine or a substituted pyridine, for example 2,6-dimethylpyridine; or it may be a secondary amine providing it is sufficiently sterically hindered. An example of a suitable secondary amine is 2,2,6,6-tetramethyl-piperidine. Preferably, however, it is a tertiary amine of formula $R^{12}R^{13}R^{14}N$ wherein $R^{12}$, $R^{13}$ and $R^{14}$ are each independently $C_1$-$C_{10}$ alkyl groups or $C_3$-$C_6$ cycloalkyl groups. The alkyl groups may be straight or branched chain. Examples of suitable alkyl groups include methyl, ethyl, isopropyl, n-propyl, n-butyl, sec-butyl and tert-butyl. Suitable tertiary amines of formula $R^{12}R^{13}R^{14}N$ are, for example, N,N-diisopropylethylamine, N,N-dimethylaniline, triethylamine, t-butyldimethylamine, N,N-diisopropylmethylamine, N,N-diisopropylisobutylamine, N,N-diisopropyl-2-ethylbutylamine, tri-n-butylamine. Preferred are amine bases selected from the group: triethylamine, diisopropylethylamine, tributyl amine, pyridine, and 2,6-dimethylpyridine. The base is preferably present in an amount of about 0.8 to about 5 equivalents per equivalent of the total alkyl acid halide(s) used, that is the sum of the functionalized and the non-functionalized alkyl acid halides.

When the base optionally used in step (b) is an amine base, a by-product of the reaction is an amine salt such as an amine hydrochloride. In one embodiment the amine salt is removed from the spent reaction mixture by, for instance, filtering the reaction mixture. In another embodiment, the mixture comprising at least one compound of each of the Formulas (I), (II) and (III) provided by step (b) can be separated from the spent reaction mixture by a variety of methods known in the art. Preferred methods include any one or more of the steps: filtering the amine salt by-product; precipitating the reaction mixture into water and filtering; partitioning the reaction mixture with water and/or organic solvents; washing with reaction mixture with water; drying the reaction mixture with a drying agent; removal of solvent by evaporation; and washing the crude product with one or more solvents which selectively remove byproducts without dissolving the mixture of compounds of Formulas (I), (II) and (III).

When used in step (b), a suitable carbodiimide dehydrating agent may be any diimide commonly used in coupling acids with alcohols and phenols. A preferred carbodiimide for step (b) is dicyclohexylcarbodiimide.

Another embodiment of this invention is a composition made by a process of the invention, which may for example be a composition of the invention. A composition comprising at least one compound of each of the Formulas (I), (II) and (III) may be obtained by (a) providing one or more organic polyol(s) comprising at least two hydroxyl groups and at least two covalently bonded carbon atoms, each hydroxyl group being bonded to a different carbon atom within an organic polyol; and (b) reacting the organic polyol(s), optionally in the presence of a base, with (i) one or more functionalized alkyl acid(s) or acid halide(s) as represented by the structure of the following Formula (X):

$$Z-(CH_2)_n-C(O)X \qquad (X)$$

wherein X is Cl, Br, I, or OH; Z is Br, I, —OTs, —OTf, or —OMs; and n is an integer equal to 3 to 20; and (ii) one or more non-functionalized alkyl acid(s) or acid halide(s) represented by the structure of the following Formula (XI):

$$Y-(CH_2)_t-C(O)X \qquad (XI)$$

wherein X is Cl, Br, I, or OH; Y is H; and t is an integer equal to 3 to 20;

with the proviso that Z is not equal to Y; in a reaction solvent and at a reaction temperature to provide a mixture comprising the composition and a spent reaction mixture.

The compositions of the invention, such as those comprising at least one compound of Formulas (VIIIa-VIIIe) and (IXa-IXe), are useful in liquid crystal compositions, which are another embodiment of the invention. Many of these compositions exhibit nematic phases upon melting. Compositions of various embodiments of the invention are given below in the examples with their corresponding thermal transitions that define their respective nematic phases.

In further embodiments of the invention, the liquid crystal compositions may include at least one chiral compound, including polymerizable and/or non-polymerizable chiral monomers. A preferred liquid crystal composition comprises at least one compound of Formulas (VIIIa-VIIIe) and (IXa-IXe).

Chiral compounds, including cholesteryl esters or carbonates, such as benzoate esters, alkyl esters and alkyl carbonates of cholesterol, are known to exhibit cholesteric phases and are known to be useful in inducing chirality in a nematic phase to produce a twisted nematic phase. The terms "twisted nematic phase", "cholesteric phase" and "chiral nematic" as used herein are synonymous. Cholesteryl esters useful for incorporation into liquid crystal compositions of this invention include cholesteryl benzoate, cholesteryl 4-alkylbenzoates and cholesteryl 4-alkoxybenzoates wherein the alkyl and alkoxy groups are $C_1$ to $C_8$ straight or branched chain alkyl groups, cholesteryl propionate, cholesteryl butanoate, cholesteryl hexanoate, cholesteryl octanoate, cholesteryl decanoate, cholesteryl undecantoate, cholesteryl dodecanoate, cholesteryl hexadecanoate, and cholesteryl octadecanoate. Cholesteryl carbonates useful for this purpose include phenyl cholesteryl carbonate, 4-alkylphenyl cholesteryl carbonates, 4-alkoxyphenyl cholesteryl carbonates, and alkyl cholesteryl carbonates wherein the alkyl or alkoxy groups are $C_1$ to $C_8$ straight or branched chain alkyl groups.

In one embodiment of a composition of this invention, the incorporated chiral compounds are polymerizable chiral monomers and include polymerizable cholesterol derivatives as described in U.S. Pat. No. 4,637,896; polymerizable terpenoid derivatives as described in U.S. Pat. No. 6,010,643; polymerizable derivatives wherein the chiral center is an asymmetric carbon atom of a branched alkyl chain as described in U.S. Pat. No. 5,560,864; polymerizable derivatives of vicinal diols or substituted vicinal diols as described in U.S. Pat. Nos. 6,120,859 and 6,607,677; and polymerizable chiral compounds as described in U.S. Pat. No. 6,723,395, 6,217,792, 5,942,030, 5,885,242, and 5,780,629. Additional examples of suitable chiral compounds are described in copending and commonly owned published US-A-2007/0267599, WO 2009/023759, and WO 2009/023762. The references listed above in this paragraph are by this reference each incorporated in its entirety as a part hereof for all purposes.

A preferred group of polymerizable chiral monomers for use in the compositions of this invention are those represented by the structure of the following Formula (XV):

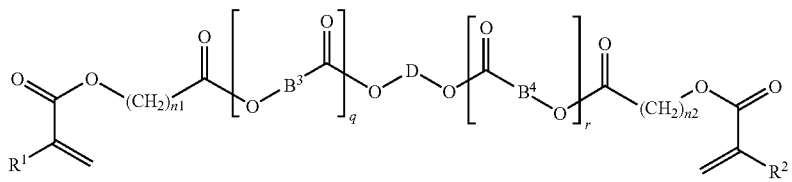

(XV)

wherein $R^1$ and $R^2$ are each independently selected from the group: H, F, Cl and $CH_3$; n1 and n2 are each independently integers 3 to 20; q and r are each independently integers 0, 1 or 2 with the proviso that q+r is $\geq 1$; D is a divalent chiral radical selected from the group:

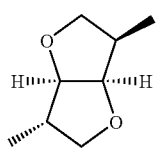

(D1)

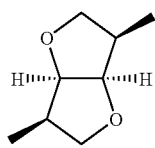

(D2)

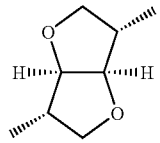

(D3)

and $B^3$ and $B^4$ are each divalent radicals independently selected from the group: $R^{11}$-substituted-1,4-phenyl, wherein $R^{11}$ is H, —$CH_3$ or —$OCH_3$; 2,6-naphthyl; and 4,4'-biphenyl; provided that when q+r=3, at least one of $B^3$ and $B^4$ is $R^4$-substituted-1,4-phenyl; and when q+r 4, at least two of $B^3$ and $B^4$ are $R^4$-substituted-1,4-phenyl. Preferably $R^1$ and $R^2$ are independently H, or $CH_3$; and n1 and n2 are independently an integer 3 to 10.

Choices may be made from within and among the prescribed ranges for the variable radicals and substituents such that the compound of Formula (XV) is, for example, either symmetric or asymmetric.

Another preferred group of polymerizable chiral monomers for practicing this invention are those represented by the structure of the following Formula (XVI):

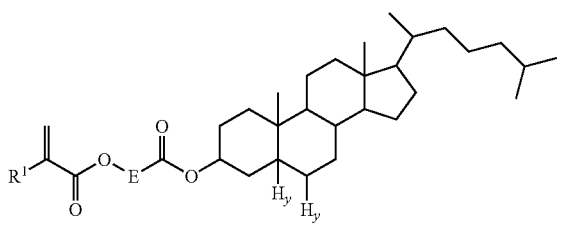

(XVI)

wherein $R^1$ is selected from the group: H, F, Cl and $CH_3$; E is selected from the group: —$(CH_2)_{n7}$—, —$(CH_2)_{n8}O$—, and —$(CH_2CH_2O)_{n9}$—; n7 and n8 are each integers 3 to 20; n9 is an integer 1 to 4; and y is an integer 0 or 1.

Forming a liquid crystal layer from a composition of this invention that optionally comprises a chiral monomer can be accomplished by any method that gives a uniform layer, or if desired, a patterned or non-uniform layer. Coating, including rod-coating, extrusion coating, gravure coating and spin-coating, spraying, printing, blading, knifing, or a combination of methods, can be used. Coating and knifing are preferred methods. Many commercial coating machines, devices such as a coating rod and knife blade, and printing machines can be used to apply the liquid crystal mixture as a liquid crystal or isotropic phase.

The ability of a twisted nematic phase to reflect light is dependent upon the alignment or texture of the twisted nematic phase. For many applications wherein a high degree of transparency is required outside the reflection band, or in applications that require very well defined reflection bands, a high degree of uniformity in a planar or homogeneous alignment is required. Discontinuities and domain boundaries in a planar alignment can cause a high degree of haze and degradation of the reflection band. A high degree of uniformity in planar alignment can be accomplished with a combination of alignment layers and/or mechanical shearing of the twisted nematic phase during and/or after application to the substrate(s). Alignment layers typically are polymers that are applied to substrates and mechanically buffed with a rubbing cloth or optically aligned with polarized light. The buffing or optical alignment allows the liquid crystal molecules applied to the interface to align in one direction. Useful polyimide alignment layers, for example, are described in U.S. Pat. No. 6,887,455. Alignment of twisted nematic phases by coating of dilute liquid crystal mixtures is described in U.S. Pat. No. 6,410,130.

Treating the liquid crystal layer to provide a desired liquid crystal phase can include steps such as cooling or heating the liquid crystal layer, for instance to achieve a desired phase or optical property; application of a mechanical shear to the liquid crystal layer, for instance by application of a knife blade to the liquid crystal layer or shearing two or more substrates wherein the liquid crystal layer is interposed; or vibration, sonication or other form of agitation to the substrate(s).

Liquid crystal compositions as provided by this invention may further comprise small amounts of a polymerizable diluent that may include, for example, 2-ethoxyethyl acrylate, diethylene glycol diacrylate, ethylene glycol dimethacrylate, diethylene glycol dimethacrylate, triethylene glycol dimethacrylate, diethylene glycol monomethyl ether acrylate, phenoxyethyl acrylate, tetraethylene glycol dimethacrylate, pentaerythritol tetraacrylate and ethoxylated pentaerythritol tetraacrylate.

Liquid crystal compositions as provided by this invention may further comprise small amounts of typical additives such as one or more of surfactants, leveling agents, viscosity modifiers, wetting agents, defoamers and UV stabilizers. Selection will often be based upon observed coating and alignment quality and the desired adhesion of the liquid crystal coating to the substrate and other layers. Typical surfactants comprise siloxy-, fluoryl-, alkyl- and alkynyl-substituted surfactants. These include the Byk® (Byk Chemie), Zonyl® (DuPont), Triton® (Dow), Surfynol® (Air Products) and Dynol® (Air Products) surfactants.

The ability of twisted nematic phases to selectively reflect light in the infrared, visible or ultraviolet region is useful in many applications. When the propagation direction of plane polarized or unpolarized light is along the helical axis of the twisted nematic layer, the wavelength of maximum reflection, $\lambda_0$, is governed by the equation $\lambda_0 = n_a p$, wherein $n_a$ is the average of $n_o$ and $n_e$, and $n_o$ and $n_e$ are defined as the ordinary and extraordinary refractive indices respectively, of the twisted nematic phase measured in the propagation direction and p is the pitch of the helix (the distance the helix takes to repeat itself). Light outside the vicinity of $\lambda_0$ is essentially unaffected in transmission. For light with a wavelength in the vicinity of wavelength $\lambda_0$, the twisted nematic phase exhibits selective reflection of the light such that approximately 50% of the light is reflected and approximately 50% of the light is transmitted, with both the reflected and transmitted beams being substantially circularly polarized. A right handed helix reflects right handed circularly polarized light and transmits left handed circularly polarized light. The bandwidth $\Delta\lambda$ of this reflected wavelength band centered about $\lambda_0$ can be determined by the formula $\Delta\lambda = \lambda_0 \cdot \Delta n/n_a$, where $\Delta n = n_e - n_o$, reflecting the birefringence present in liquid crystal materials. The pitch p can be tuned effectively by manipulating the amount of chiral dopant, the twisting power of the dopant and selection of the nematic materials. The pitch is sensitive to temperature, unwinding or tightening with a change in temperature; and to electric fields, dopants, and other environmental considerations. Thus, in the twisted nematic phase, manipulation of the pitch, and thus the wavelength of maximum reflection, can be accomplished with a wide variety of tools. Furthermore, the bandwidth $\Delta\lambda$ of the reflected wavelength band also can be manipulated in the manner described in U.S. Pat. Nos. 5,506,704 and 5,793,456.

Articles derived from a composition of the invention are useful as optical elements or components of an optical element. An optical element is any film, coating or shaped object that is used to modify the characteristics of light. The modifications produced by optical elements include changes in the intensity of light through changes in transmission or reflectivity, changes in wavelength or wavelength distribution, changes in the state of polarization, changes in the direction of propagation of part or all of the light, or changes in the spatial distribution of intensity by, for example, focusing, collimating, or diffusing the light. Examples of optical elements include linear polarizers, circular polarizers, lenses, mirrors, collimators, diffusers, reflectors and the like. Examples of the usefulness of articles, including optical elements, comprising liquid crystal compositions are provided, for example, in a general review by P. Palffy-Muhoray in "The Diverse World of Liquid Crystals", *Physics Today* (2007), 60(9), pp. 54-60.

EXAMPLES

The advantageous attributes and effects of this invention may be more fully appreciated from a series of examples (Examples 1~3), as described below. The embodiments on which the examples are based are representative only, however, and the selection of those embodiments to illustrate the invention does not indicate that materials, conditions, specifications, components, regimes, reactants, steps, ingredients, or techniques not described in these examples are not suitable for practicing this invention, or that subject matter not described in these examples is excluded from the scope of the appended claims and equivalents thereof.

In the following examples, thermal transitions are given in degrees Centigrade. The following notations are used to describe the observed phases: K=crystal, N=nematic, S=smectic, TN*=twisted nematic, X=unidentified phase, I=isotropic, P=polymerized. The thermal transitions and phase assignments were made with differential scanning calorimetry and hotstage optical microscopy. Unless noted otherwise, the phase behavior refers to the first heating cycle.

Compound 1 was obtained as described in US-A-2007/0228326. All other materials used in the examples were obtained from commercial sources.

Example 1

This example illustrates the formation of Mixture 1, a liquid crystal mixture of one embodiment of the invention. Mixture 1 corresponds to a composition comprising one compound of Formula (I), two compounds of Formula (II), and one compound of Formula (III).

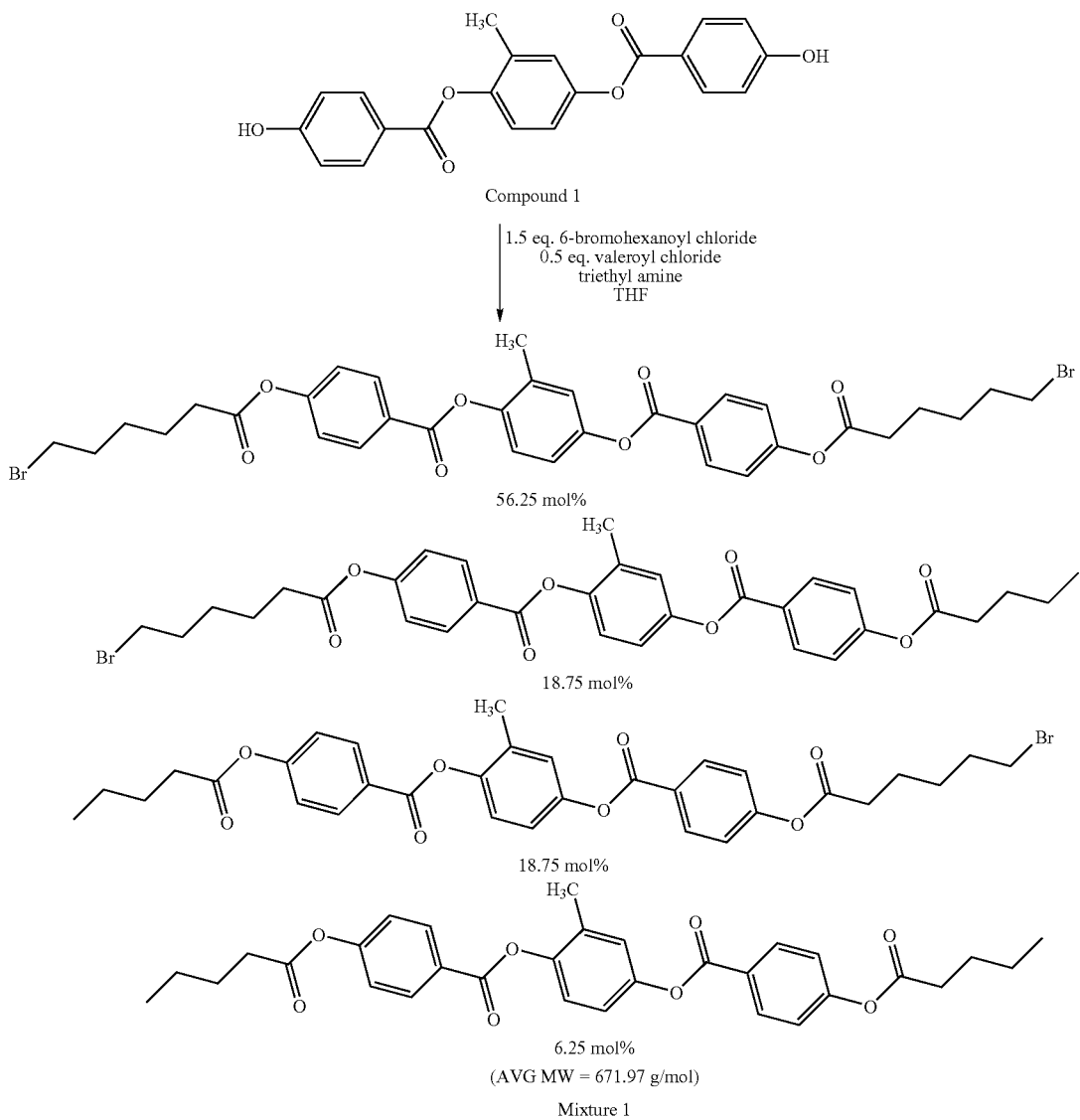

Mixture 1

10 g of Compound 1 was dissolved in 40 mL THF and 9.5 mL triethylamine and cooled to 0° C. A mixture of 8.96 g 6-bromohexanoyl chloride and 1.68 g valeroyl chloride in 60 mL THF was added dropwise over 20 minutes. Stirring was continued for another 30 minutes at 0° C. The cooling bath was removed and the reaction allowed to stir for an additional 90 minutes. The reaction was filtered to remove salts and the salts were washed with THF. Approximately 75% of the solvent was removed under reduced pressure and the crude oil was added to an excess of water, forming a colorless precipitate. The solids were filtered, washed with water, methanol, and dried to provide 17.74 g of Mixture 1. $1^{st}$ heating: K 81-85 N 177-179 I

Example 2

This example illustrates the formation of Mixture 2, a liquid crystal mixture of one embodiment of the invention. Mixture 2 corresponds to a composition comprising one compound of Formula (I), four compounds of Formula (II), and four compounds of Formula (III).

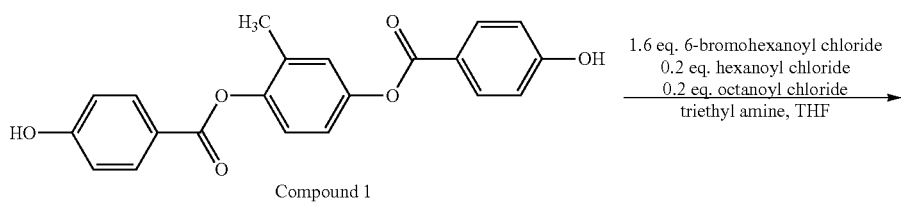

-continued
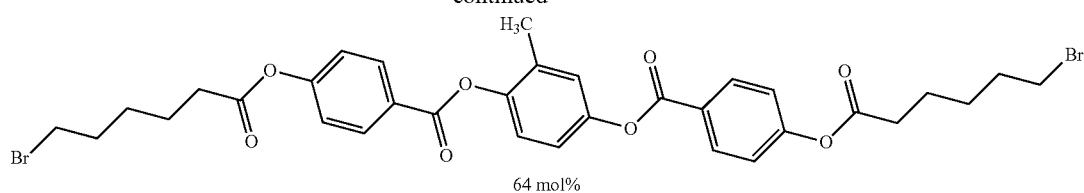
64 mol%
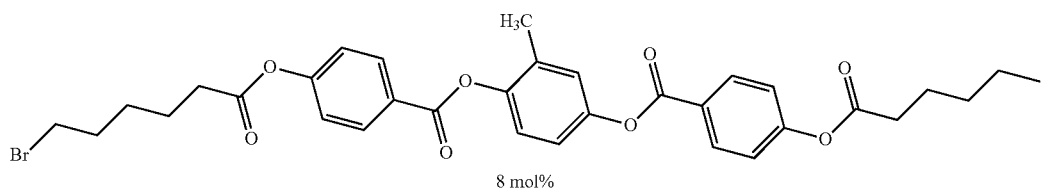
8 mol%
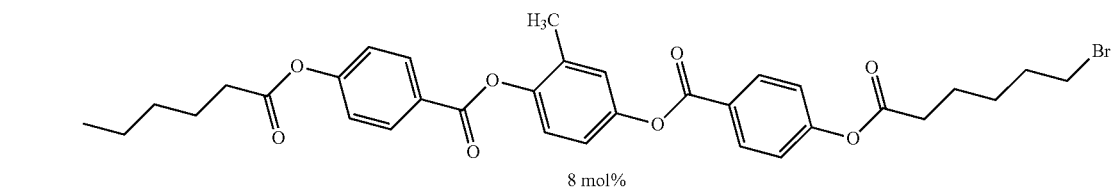
8 mol%
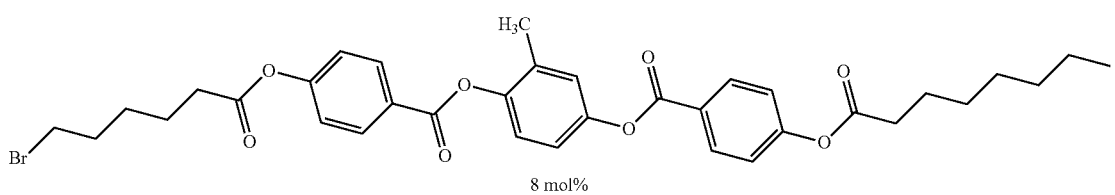
8 mol%
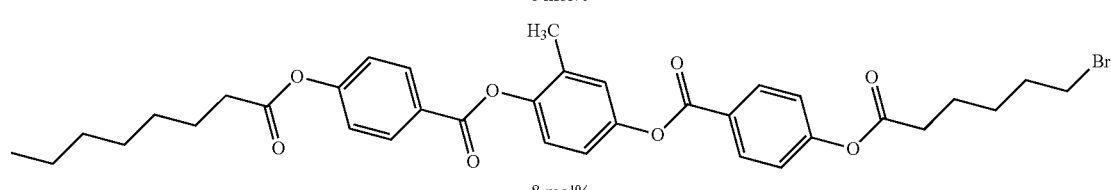
8 mol%
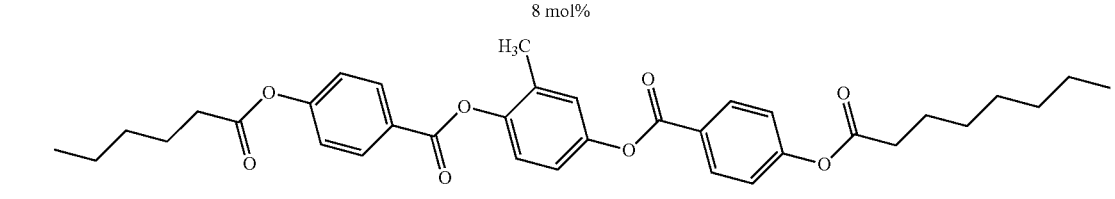
1 mol%
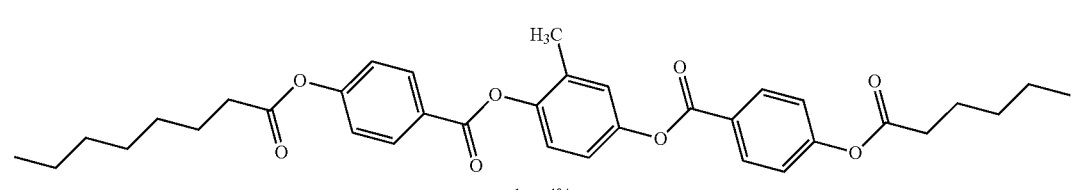
1 mol%
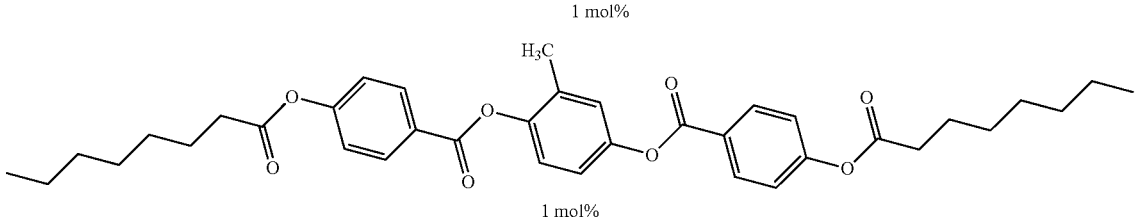
1 mol%

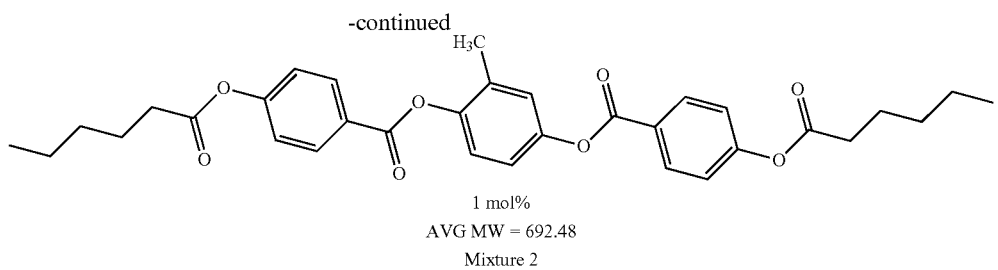

1 mol%
AVG MW = 692.48
Mixture 2

10 g of Compound 1 was dissolved in 40 mL THF and 9.5 mL triethylamine and the solution was cooled to 0° C. A mixture of 9.56 g 6-bromohexanoyl chloride, 0.75 g hexanoyl chloride, and 0.91 g octanoyl chloride in 30 mL THF was added dropwise over 20 minutes. The reaction mixture was stirred for another 30 minutes at 0° C., the cooling bath was removed and the reaction was allowed to stir for an additional 90 minutes. The reaction mixture was filtered to remove salts, the salts were rinsed with THF and the organics were diluted with diethyl ether and washed with water. The organics were dried over $MgSO_4$, filtered, and concentrated to provide 18.58 g of Mixture 2 as an off-white solid. $1^{st}$ heating: K 85-91 N 166-171 I Example 3

This example illustrates the formation of Mixture 3, a liquid crystal mixture of one embodiment of the invention. Mixture 3 corresponds to a composition comprising four compounds of Formula (I), eight compounds of Formula (II), and four compounds of Formula (III).

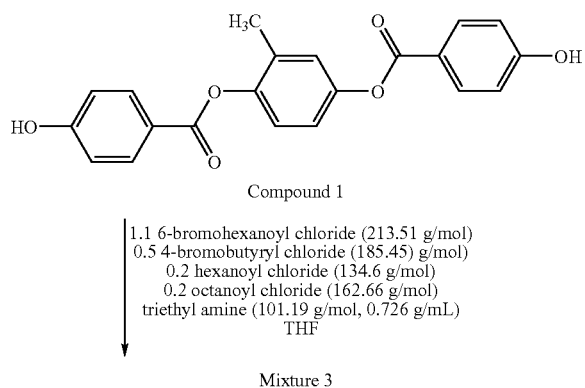

Compound 1

1.1 6-bromohexanoyl chloride (213.51 g/mol)
0.5 4-bromobutyryl chloride (185.45 g/mol)
0.2 hexanoyl chloride (134.6 g/mol)
0.2 octanoyl chloride (162.66 g/mol)
triethyl amine (101.19 g/mol, 0.726 g/mL)
THF

↓

Mixture 3

TABLE 2

Statistical Mixture of Compounds with Average Molecular Weight of 678.4535 g/mol in Mixture 3

| Isomer | Mole % | a | Z | b | Y |
|---|---|---|---|---|---|
| 1 | 30.25 | 5 | Br | 5 | Br |
| 2 | 13.75 | 5 | Br | 3 | Br |
| 3 | 5.50 | 5 | Br | 5 | H |
| 4 | 5.50 | 5 | Br | 7 | H |
| 5 | 13.75 | 3 | Br | 5 | Br |
| 6 | 6.25 | 3 | Br | 3 | Br |
| 7 | 2.50 | 3 | Br | 5 | H |
| 8 | 2.50 | 3 | Br | 7 | H |
| 9 | 5.50 | 5 | H | 5 | Br |
| 10 | 2.50 | 5 | H | 3 | Br |

TABLE 2-continued

Statistical Mixture of Compounds with Average Molecular Weight of 678.4535 g/mol in Mixture 3

| Isomer | Mole % | a | Z | b | Y |
|---|---|---|---|---|---|
| 11 | 1.00 | 5 | H | 5 | H |
| 12 | 1.00 | 5 | H | 7 | H |
| 13 | 5.50 | 7 | H | 5 | Br |
| 14 | 2.50 | 7 | H | 3 | Br |
| 15 | 1.00 | 7 | H | 5 | H |
| 16 | 1.00 | 7 | H | 7 | H |

Each of the formulae shown herein describes each and all of the separate, individual compounds that can be formed in that formula by (i) selection from within the prescribed range for one of the variable, substituents or numerical coefficients while all of the other variable radicals, substituents or numerical coefficients are held constant, and (ii) performing in turn the same selection from within the prescribed range for each of the other variable radicals, substituents or numerical coefficients with the others being held constant. In addition to a selection made within the prescribed range for any of the variable radicals, substituents or numerical coefficients of only one of the members of the group described by the range, a plurality of compounds may be described by selecting more than one but less than all of the members of the group of radicals, substituents or numerical coefficients. When the selection made within the prescribed range for any of the variable radicals, substituents or numerical coefficients is a subgroup containing (a) only one of the members of the group described by the range, or (b) more than one but less than all of the members of the group, the selected member(s) are selected by omitting those member(s) of the whole group that are not selected to form the subgroup. The compound, or plurality of compounds, may in such event be described as containing one or more variable radicals, substituents or numerical coefficients each of which variable radicals, substituents or numerical coefficients is defined by the members of the whole group, described by the range for that variable radical, substituent or numerical coefficient in the absence of the member(s) omitted to form the subgroup.

Certain features of this invention are described herein in the context of an embodiment that combines various such features together, whether as described in the disclosure or in one of the drawings. The scope of the invention is not, however, limited by the description of only certain features within any particular embodiment, and the invention also includes (1) a subcombination of fewer than all of the features of any described embodiment, which subcombination is characterized by the absence of the features omitted to form the subcombination; (2) each of the features, individually, included within the combination of the described embodiment; and (3) other combinations of features formed from one or more or all of the features of the described embodiment together with other features as disclosed elsewhere herein.

Where a range of numerical values is recited herein, the range includes the endpoints thereof and all the individual integers and fractions within the range, and also includes each of the narrower ranges therein formed by all the various possible combinations of those endpoints and internal integers and fractions to form subgroups of the larger group of values to the same extent as if each of those narrower ranges was explicitly recited. Where a range of numerical values is stated herein as being greater than a stated value, the range is nevertheless finite and is bounded on its upper end by a value that is operable within the context of the invention as described herein. Where a range of numerical values is stated herein as being less than a stated value, the range is nevertheless bounded on its lower end by a non-zero value.

In this specification, unless explicitly stated otherwise or indicated to the contrary by the context of usage, where an embodiment of this invention is stated or described as comprising, including, containing, having, being composed of or being constituted by or of certain features or elements, one or more features or elements in addition to those explicitly stated or described may be present in the embodiment. An alternative embodiment of this invention, however, may be stated or described as consisting essentially of certain features or elements, in which embodiment features or elements that would materially alter the principle of operation or the distinguishing characteristics of the embodiment are not present therein. A further alternative embodiment of this invention may be stated or described as consisting of certain features or elements, in which embodiment, or in insubstantial variations thereof, only the features or elements specifically stated or described are present.

In this specification, unless explicitly stated otherwise or indicated to the contrary by the context of usage, (a) amounts, sizes, formulations, parameters, and other quantities and characteristics recited herein, particularly when modified by the term "about", may but need not be exact, and may be approximate and/or larger or smaller than stated (as desired), reflecting tolerances, conversion factors, rounding off, measurement error and the like, as well as the inclusion within a stated value of those values outside it that have, within the context of this invention, functional and/or operable equivalence to the stated value;

(b) all numerical quantities of parts, percentage or ratio are given as parts, percentage or ratio by weight;

(c) use of the indefinite article "a" or "an" with respect to a statement or description of the presence of an element or feature of this invention, does not limit the presence of the element or feature to one in number;

(d) the words "include", "includes" and "including" are to be read and interpreted as if they were followed by the phrase "without limitation" if in fact that is not the case; and (e) the word "or", as used herein, is inclusive; more specifically, the phrase "A or B" means "A, B, or both A and B"; and use of "or" in an exclusive sense is designated, for example, by terms such as "either A or B" and "one of A or B".

What is claimed is:

1. A composition comprising at least one compound from the group of compounds represented by the structures of each of the following Formulas (I), (II) and (III),

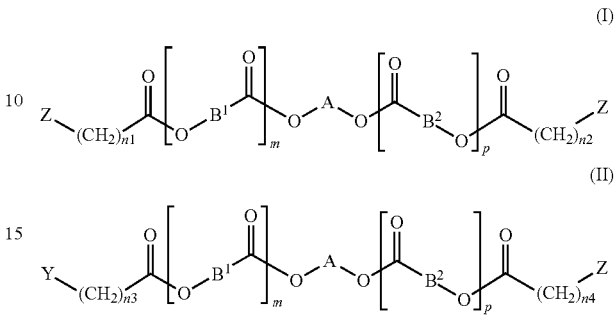

wherein
Z is F, Cl, Br, I, —OTs, —OTf, —OMs, CN, or $NO_2$;
Y is H, F, Cl, Br, I, —OTs, —OTf, —OMs, CN, or $NO_2$;
with the proviso that Z is not equal to Y;
n1, n2, n3, and n4, are each independently integers 3 to 20;
m and p are each independently integers 0, 1, or 2;
A is a divalent radical selected from the group:

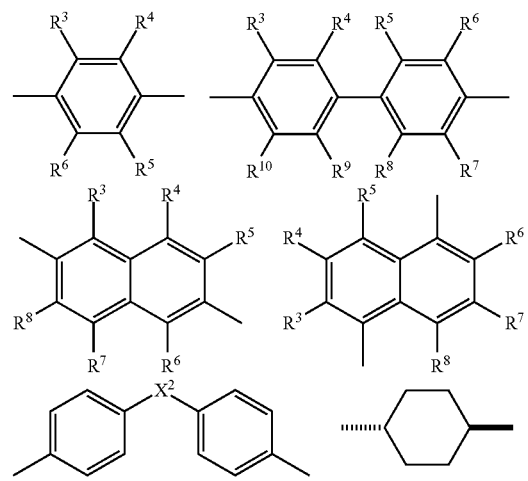

wherein $R^3$ through $R^{10}$ are each independently selected from the group: H, $C_1$ to $C_8$ straight or branched chain alkyl, $C_1$ to $C_8$ straight or branched chain alkyloxy, F, Cl, phenyl, —C(O)$CH_3$, CN, and $CF_3$; $X^2$ is a divalent radical selected from the group: —O—, —$(CH_3)_2$C—, and —$(CF_3)_2$C—; and each $B^1$ and $B^2$ is a divalent radical independently selected from the group: $R^{11}$-substituted-1,4-phenyl, wherein $R^{11}$ is H, —$CH_3$ or —$OCH_3$; 2,6-naphthyl; and 4,4'-biphenyl; with the proviso that when m+p is equal to 3 or 4, at least two of $B^1$ and $B^2$ are $R^{11}$-substituted-1,4-phenyl; and (III)

$$Y\diagdown_{(CH_2)_{n5}}\overset{O}{\underset{}{\text{C}}}\left[O-B^1\overset{O}{\underset{}{\text{C}}}\right]_m O-A-O\left[\overset{O}{\underset{}{\text{C}}}-B^2-O\right]_p\overset{O}{\underset{}{\text{C}}}_{(CH_2)_{n6}}\diagup Y$$

wherein
n5 and n6 are each independently integers 3 to 20;
m is an integer 1, or 2;
p is an integer 0, 1, or 2; and wherein
Y; A; $R^3$ through $R^{10}$; $X^2$; $B^1$ and $B^2$; and $R^{11}$ are as set forth above.

2. The composition of claim 1 wherein the total amount of compounds of Formula (I) are present in the range of about 5 mole percent to about 95 mole percent based on the total content of the composition.

3. The composition of claim 1 wherein the total amount of compounds of Formula (II) are present in the range of about 0.1 mole percent to about 50 mole percent based on the total content of the composition.

4. The composition of claim 1 wherein the total amount of compounds of Formula (III) are present in the range of about 0.1 mole percent to about 90 mole percent based on the total content of the composition.

5. The composition of claim 1 wherein for at least one compound of each of the Formulas (I), and (II), m is 0 and p is 0.

6. The composition of claim 1 wherein for at least one compound of each of the Formulas (I), (II) and (III), m is 1 and p is 0.

7. The composition of claim 1 wherein for at least one compound of each of the Formulas (I), (II) and (III), m is 1 and p is 1.

8. The composition of claim 1 wherein for at least one compound of each of the Formulas (I), (II) and (III), m is 1 and p is 0; and wherein for at least one compound of each of the Formulas (I), (II) and (III), m is 1 and p is 1.

9. The composition of claim 1 wherein n1 through n6 are each independently selected from the group consisting of 3 to 10.

10. The composition of claim 1 wherein n1, n2, and n4 are the same.

11. The composition of claim 1 wherein the composition comprises only one compound of Formula (I).

12. The composition of claim 11 wherein n1, n2, and n4 are the same.

13. The composition of claim 1 wherein Z is Br, I, —OTs, —OTf, or —OMs; and Y is H, Br, I, —OTs, —OTf, or —OMs.

14. The composition of claim 13 wherein Z is Br and Y is H.

15. A liquid crystal composition comprising the composition of claim 1.

16. The liquid crystal composition of claim 15 wherein Formula (I) is Formula (XXIII), as follows:

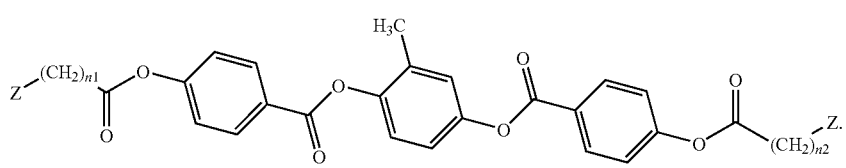

17. The liquid crystal composition of claim 15 further comprising at least one chiral compound.

18. An article comprising the liquid crystal composition of claim 15.

19. An article comprising the liquid crystal composition of claim 17.

20. The article of claim 18 which is fabricated as an optical element.

21. The article of claim 19 which is fabricated as an optical element.

22. A composition comprising at least one compound from the group of compounds represented by the structures of each of the following Formulas (I), (II) and (III), (I)

(II)

(III)

wherein

Z is F, Cl, Br, I, —OTs, —OTf, —OMs, CN, or $NO_2$;

Y is H, F, Cl, Br, I, —OTs, —OTf, —OMs, CN, or $NO_2$;

with the proviso that Z is not equal to Y;

n1, n2, n3, n4, n5, and n6 are each independently integers 3 to 20;

m and p are each independently integers 0, 1, or 2;

A is a divalent radical selected from the group:

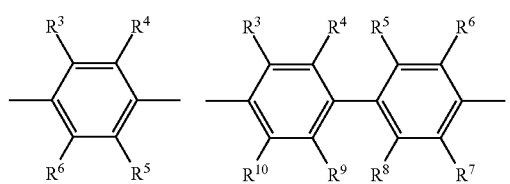

-continued

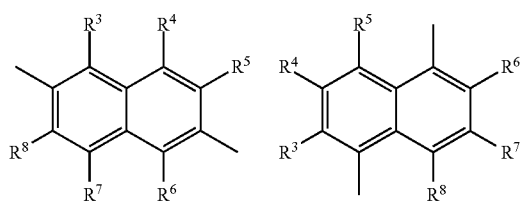

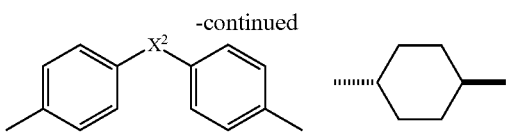

wherein $R^3$ through $R^{10}$ are each independently selected from the group: H, $C_1$ to $C_8$ straight or branched chain alkyl, $C_1$ to $C_8$ straight or branched chain alkyloxy, F, Cl, phenyl, —C(O)CH$_3$, CN, and CF$_3$; $X^2$ is a divalent radical selected from the group: —O—, —(CH$_3$)$_2$C—, and —(CF$_3$)$_2$C—; and each $B^1$ and $B^2$ is a divalent radical independently selected from the group: $R^{11}$-substituted-1,4-phenyl, wherein $R^{11}$ is H, —CH$_3$ or —OCH$_3$; 2,6-naphthyl; and 4,4'-biphenyl; with the proviso that when m+p is equal to 3 or 4, at least two of $B^1$ and $B^2$ are $R^{11}$-substituted-1,4-phenyl; and wherein (a) the total amount of compounds of Formula (I) are present in the range of about 5 mole percent to about 95 mole percent based on the total content of the composition; or (b) the total amount of compounds of Formula (II) are present in the range of about 0.1 mole percent to about 50 mole percent based on the total content of the composition.

23. The composition of claim 22 wherein the total amount of compounds of Formula (II) are present in the range of about 0.1 mole percent to about 50 mole percent based on the total content of the composition.

24. The composition of claim 22 wherein the total amount of compounds of Formula (III) are present in the range of about 0.1 mole percent to about 90 mole percent based on the total content of the composition.

25. The composition of claim 22 wherein for at least one compound of each of the Formulas (I), (II) and (III), m is 0 and p is 0.

26. The composition of claim 22 wherein for at least one compound of each of the Formulas (I), (II) and (III), m is 1 and p is 0.

27. The composition of claim 22 wherein for at least one compound of each of the Formulas (I), (II) and (III), m is 1 and p is 1.

28. The composition of claim 22 wherein for at least one compound of each of the Formulas (I), (II) and (III), m is 1 and p is 0; and wherein for at least one compound of each of the Formulas (I), (II) and (III), m is 1 and p is 1.

29. The composition of claim 22 wherein n1 through n6 are each independently selected from the group consisting of 3 to 10.

30. The composition of claim 22 wherein n1, n2, and n4 are the same.

31. The composition of claim 22 wherein the composition comprises only one compound of Formula (I).

32. The composition of claim 31 wherein n1, n2, and n4 are the same.

33. The composition of claim 22 wherein Z is Br, I, —OTs, —OTf, or —OMs; and Y is H, Br, I, —OTs, —OTf, or —OMs.

34. The composition of claim 33 wherein Z is Br and Y is H.

35. A liquid crystal composition comprising the composition of claim 22.

36. The liquid crystal composition of claim 35 wherein Formula (I) is Formula (XXIII), as follows:

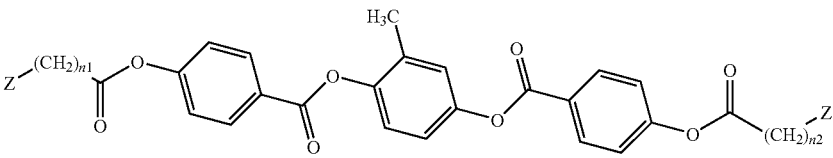

(XXIII)

37. The liquid crystal composition of claim 35 further comprising at least one chiral compound.

38. An article comprising the liquid crystal composition of claim 35.

39. An article comprising the liquid crystal composition of claim 37.

40. The article of claim 38 which is fabricated as an optical element.

41. The article of claim 39 which is fabricated as an optical element.

42. The composition of claim 22 wherein the total amount of compounds of Formula (I) are present in the range of about 5 mole percent to about 95 mole percent based on the total content of the composition.

* * * * *

UNITED STATES PATENT AND TRADEMARK OFFICE
CERTIFICATE OF CORRECTION

| | |
|---|---|
| PATENT NO. | : 8,034,255 B2 |
| APPLICATION NO. | : 12/480003 |
| DATED | : October 11, 2011 |
| INVENTOR(S) | : Marc B. Goldfinger |

It is certified that error appears in the above-identified patent and that said Letters Patent is hereby corrected as shown below:

At column 4, lines 48-49, the phrase "$X^2$ is a divalent radical selected from the group: -O-, -(CH$_3$)$_2$-, and –(CF$_3$)$_2$C-;" should be replaced with the phrase "$X^2$ is a divalent radical selected from the group: -O-, -(CH$_3$)$_2$C-, and –(CF$_3$)$_2$C-;"

Signed and Sealed this
Twenty-ninth Day of May, 2012

David J. Kappos
*Director of the United States Patent and Trademark Office*